US011722948B2

(12) United States Patent
Tsuda

(10) Patent No.: US 11,722,948 B2
(45) Date of Patent: Aug. 8, 2023

(54) RADIO COMMUNICATION DEVICE, RADIO PATH CONTROL METHODS AND PROGRAMMES

(71) Applicant: RENESAS ELECTRONICS CORPORATION, Tokyo (JP)

(72) Inventor: Hiroaki Tsuda, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 7 days.

(21) Appl. No.: 17/237,677

(22) Filed: Apr. 22, 2021

(65) Prior Publication Data

US 2021/0392563 A1  Dec. 16, 2021

(30) Foreign Application Priority Data

Jun. 10, 2020 (JP) ................................. 2020-100653

(51) Int. Cl.
*H04W 40/12* (2009.01)
*H04W 24/08* (2009.01)

(52) U.S. Cl.
CPC ........... *H04W 40/12* (2013.01); *H04W 24/08* (2013.01)

(58) Field of Classification Search
CPC .................................................. H04W 40/12
See application file for complete search history.

(56) References Cited

U.S. PATENT DOCUMENTS

| 10,595,255 | B2 | 3/2020 | Maeda |
| 2006/0114881 | A1 | 6/2006 | Chari et al. |
| 2015/0188663 | A1* | 7/2015 | Park ..................... H04L 1/0021 714/2 |
| 2017/0099218 | A1* | 4/2017 | Holcombe ............. H04L 45/22 |
| 2017/0244471 | A1* | 8/2017 | Nagakubo ........... H04W 40/005 |
| 2018/0262401 | A1 | 9/2018 | Shah et al. |
| 2019/0174389 | A1* | 6/2019 | Kamp ...................... H04L 1/08 |
| 2021/0336879 | A1* | 10/2021 | Nguyen ................. H04L 43/16 |
| 2022/0038990 | A1* | 2/2022 | Östervall .............. H04L 45/123 |

FOREIGN PATENT DOCUMENTS

| EP | 3032914 B1 * | 10/2017 | ............ H04L 41/12 |
| EP | 3 579 619 A1 | 12/2019 | |
| JP | 2019-009638 A | 1/2019 | |
| WO | 2018/024489 A1 | 2/2018 | |

OTHER PUBLICATIONS

Extended European Search Report issued in corresponding European Patent Application No. 21177955.8-1215, dated Nov. 10, 2021.

* cited by examiner

Primary Examiner — Abdeltif Ajid
(74) Attorney, Agent, or Firm — McDermott Will & Emery LLP

(57) ABSTRACT

A calculation accuracy of a communication quality for use in selecting a communication path is improved. A radio communication device includes: a first calculator configured to calculate a transmission quality indicator value of each of a plurality of parent candidate nodes on the basis of a transmission frame transmitted from an own device to each of the plurality of parent candidate nodes; a second calculator configured to calculate a reception quality indicator value of each of the parent candidate nodes on the basis of a reception frame transmitted from each of the plurality of parent candidate nodes and received by the own device; and a selector configured to select a parent node for use in the communication path among the plurality of parent candidate nodes on the basis of the transmission quality indicator value and the reception quality indicator value.

17 Claims, 18 Drawing Sheets

RADIO COMMUNICATION DEVICE, RADIO PATH CONTROL METHODS AND PROGRAMMES

CROSS-REFERENCE TO RELATED APPLICATION

The disclosure of Japanese Patent Application No. 2020-100653 filed on Jun. 10, 2020, including the specification, drawings and abstract is incorporated herein by reference in its entirety.

BACKGROUND

The present invention relates to a radio communication device, radio path control methods and programs.

In Wi-SUN (Wireless-Smart Utility Network) FAN (Field Area Network), RPL (IPv6 Routing Protocol for Low power and Lossy network) is utilized for network routing control.

There are disclosed techniques listed below.

[Patent Document 1] Japanese Unexamined Patent Application Publication No. 2019-9638

The Patent Document 1 discloses a technique related to a method of building a tree-type radio network in which a plurality of radio communication devices are autonomously connected and rebuilding the network if failure occurs in the radio communication network.

SUMMARY

When the RPL is utilized for the routing control, there is a problem such as insufficient calculation accuracy of a communication quality for use in selecting a communication path.

Other objects and novel characteristics will be apparent from the description of the present specification and the accompanying drawings.

According to an embodiment, a parent node is selected on the basis of a transmission quality indicator value based on a transmission frame transmitted to a plurality of parent candidate nodes and a reception frame transmitted from the plurality of parent candidate nodes and received.

According to the embodiment, the calculation accuracy of the communication quality for use in selecting the communication path can be improved.

BRIEF DESCRIPTIONS OF THE DRAWINGS

DETAILED DESCRIPTION

Figure 1:
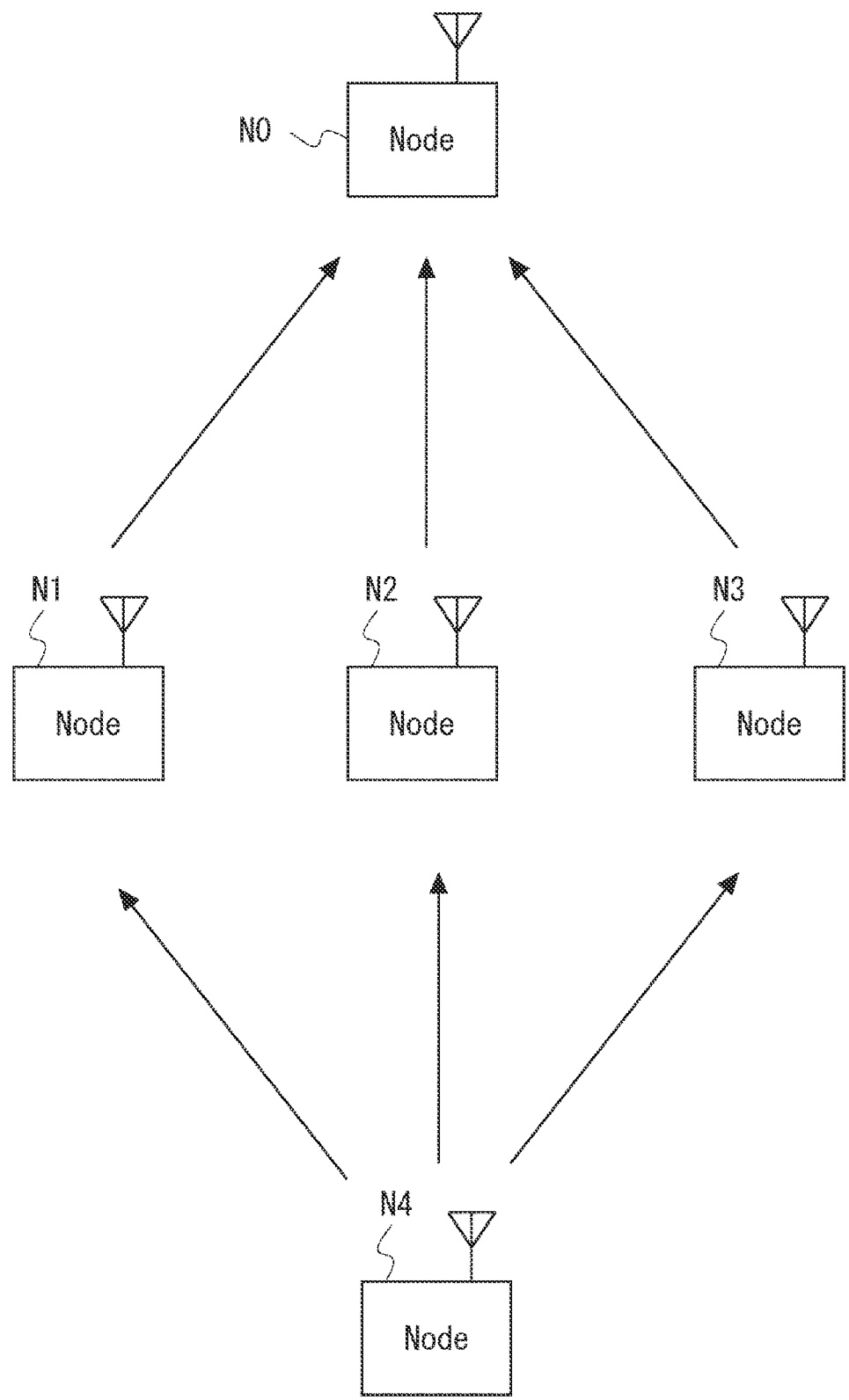
FIG. 1 is a diagram showing an arrangement example of a plurality of radio communication devices according the present first embodiment.

In order to make the explanation clear, the following descriptions and drawings will be appropriately omitted and simplified. Each element as a functional block for various processing illustrated in the drawings is achieved by a CPU (Central Processing Unit), a memory or other circuit in terms of hardware, or configured of a program that is loaded to a memory or others in terms of software. Therefore, by those who are skilled in the art, it would be understood that such a functional block is achieved by various aspects such as only the hardware, only the software, or combination of the hardware and the software, and such a functional block is not limited to any of them. In each drawing, note that the same element is denoted with the same reference symbol, and is omitted in repeated explanation if needed.

The above-described program can be stored by using a non-transitory computer readable medium of various types, and can be loaded to a computer. Such non-transitory computer readable media include tangible recording media of various types. Examples of the non-transitory computer readable medium include a magnetic recording medium (such as a flexible disc, a magnetic tape and a hard disc drive), a magnetooptical recording medium (such as a magnetooptical disc), a CD-ROM (Read Only Memory), CD-R, a CD-R/W, and a semiconductor memory (such as a mask ROM, a PROM (Programmable ROM), EPROM (Erasable PROM), a flash ROM, and a RAM (Random Access Memory)). Alternatively, the program may be loaded to the computer by a transitory computer readable medium of various types. Examples of the transitory computer readable medium include an electrical signal, an optical signal and an electromagnetic wave. The transitory computer readable medium can load the program to the computer through a wired communication path such as an electrical wire or an optical fiber or a radio communication path.

A related art of the following present embodiments will be supplementarily explained. In the RPL, as described below, a parent node in a communication path of an own node is selected among a plurality of parent candidate nodes. First, a "rank" that is an indicator value for indicating a relative position from a route node (border router) is assigned to the parent candidate node. And, the own node calculates an ETX (Expected Transmission Count) that is an indicator value of a quality of transmission from the own node to each parent candidate node. For example, the ETX is calculated by using the following formula 1.

$$\text{ETX} = \text{"(The number of frame transmissions)/(The number of ACK-frame receptions)} \times 128" \quad \text{(Formula 1)}$$

In the formula, "the number of frame transmissions" is the number of times of unicast-frame transmission from the own node to a destination node (parent candidate node). And, "the number of ACK-frame receptions" is the number of times of a check-response frame reception for the unicast frame transmitted from the destination node and received at the own node.

By adding the rank of each parent candidate node and the ETX, the own node calculates a rank candidate value of the own node in a case of taking each parent candidate node as the parent node. That is, the rank candidate value "RANKC" is calculated by using the following formula 2.

$$\text{(Rank candidate value "RANKC")} = \text{(Rank of parent candidate node "RANK")} + \text{(ETX for parent candidate node)} \quad \text{(Formula 2)}$$

Then, the own node selects a parent candidate node having the smallest rank candidate value as the parent node. And, the own node sets the smallest rank candidate value of the plurality of rank candidate values as the rank of its own.

Figure 18:
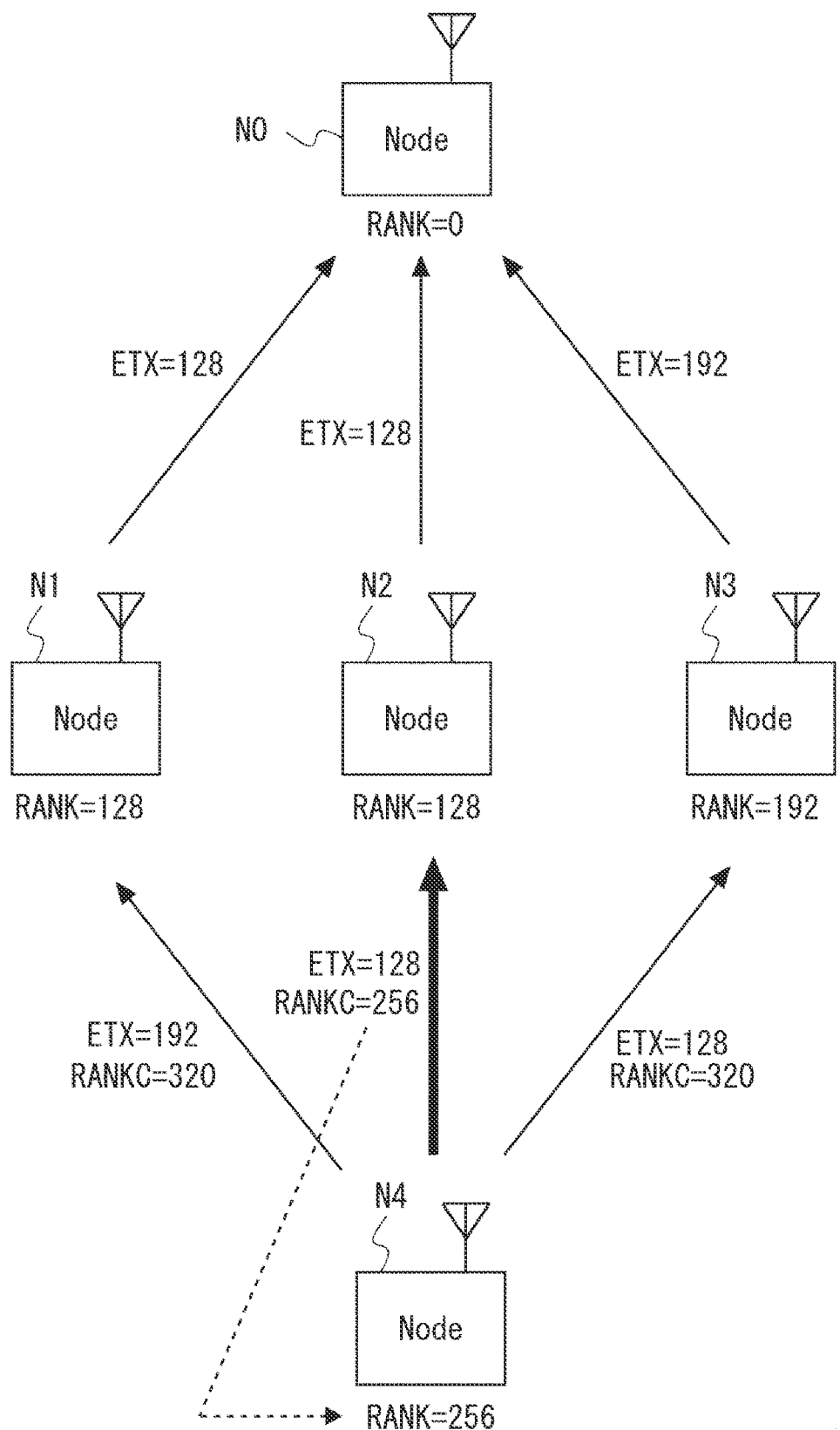
FIG. 18 is a diagram showing a network configuration example in a radio communication device according to a related art.

FIG. 18 is a diagram showing a network configuration example of a radio communication device according to the related art. First, a node "N0" is the border router, and is set to have a rank "0". Next, each of nodes "N1" to "N3" is assumed to be a child node taking the node N0 as a parent node. In this case, the node N1 is assumed to transmit the unicast frame to the node N0 three times and receive the check response for the unicast frame from the node N0 three times. Therefore, the ETX in the communication from the node N1 to the node N0 is calculated as "3/3×128=128" by using the formula 1. And, the rank of the node N1 is calculated as "0+128=128" by using the formula 2.

Similarly, the ETX in the communication from the node N2 to the node N0 is assumed to be 128, and the rank of the node N2 is assumed to be 128. The node N3 is assumed to transmit the unicast frame to the node N0 three times and receive the check response for the unicast frame from the node N0 twice. That is, the number of times of the check response is less by one. Therefore, the ETX in the communication from the node N3 to the node N0 is calculated as "3/2×128=192" by using the formula 1. And, the rank of the node N3 is calculated as "0+192=192" by using the formula 2.

In this situation, a node N4 takes the nodes N1 to N3 as its parent candidate nodes, and selects a suitable parent node from these parent candidate nodes. In this case, the ETX in the communication from the node N4 to the node N1 is assumed to be 192, the ETX in the communication from the node N4 to the node N2 is assumed to be 128, and the ETX in the communication from the node N4 to the node N3 is assumed to be 128. In this case, a rank candidate value obtained when the node N4 takes the node N1 as its parent node is calculated as "128+192=320" by using the formula 2. Similarly, a rank candidate value obtained when the node N4 takes the node N2 as its parent node is calculated as 256, and a rank candidate value obtained when the node N4 takes the node N3 as its parent node is calculated as 320. Then, the node N4 selects the node N2 having the smallest rank candidate value (256) as its parent node from the nodes N1 to N3 that are its parent candidate nodes, and the rank of the node N4 is set to 256. In the related art, the parent node is selected as described above.

However, the related art has the following problems. First, a frequency of the update of the parent node is low, and therefore, it is difficult to use the suitable radio communication path. This is because the ETX-calculation target frames are the unicast frame, of which the destination is the parent candidate node, and the ACK frame for use in the check response for this unicast frame. For example, in the Wi-SUN FAN, a communication frequency in the transmission/reception of these frames is normally about one frame for each several minutes. Therefore, the latest radio communication quality is difficult to be reflected. And, the ETX-calculation target frames have a low error occurrence rate, and therefore, it is difficult to make difference in the ETX among the plurality of parent candidate nodes. Thus, the difference in the rank that is the indicator value for selecting the parent candidate node tends to be small among the child nodes, and therefore, it is also difficult to make difference in the rank candidate value. Thus, the calculation accuracy of the communication quality for use in selecting the communication path is insufficient.

In consideration of the above description, embodiments for solving at least one of these problems will be explained below.

First Embodiment

FIG. 1 is a diagram showing an arrangement example of a plurality of radio communication paths according to the present first embodiment. Each of the nodes N0 to N4 is an example of a radio communication device 100 according to the present first embodiment. Particularly, in FIG. 1, the node N0 is assumed to be the border router, and each of the nodes N1 to N3 is assumed to be the child node taking the node N0 as the parent node. And, the node N4 is allowed to select any of the nodes N1 to N3 as its parent node, and is assumed to constantly update the parent node.

Figure 2:
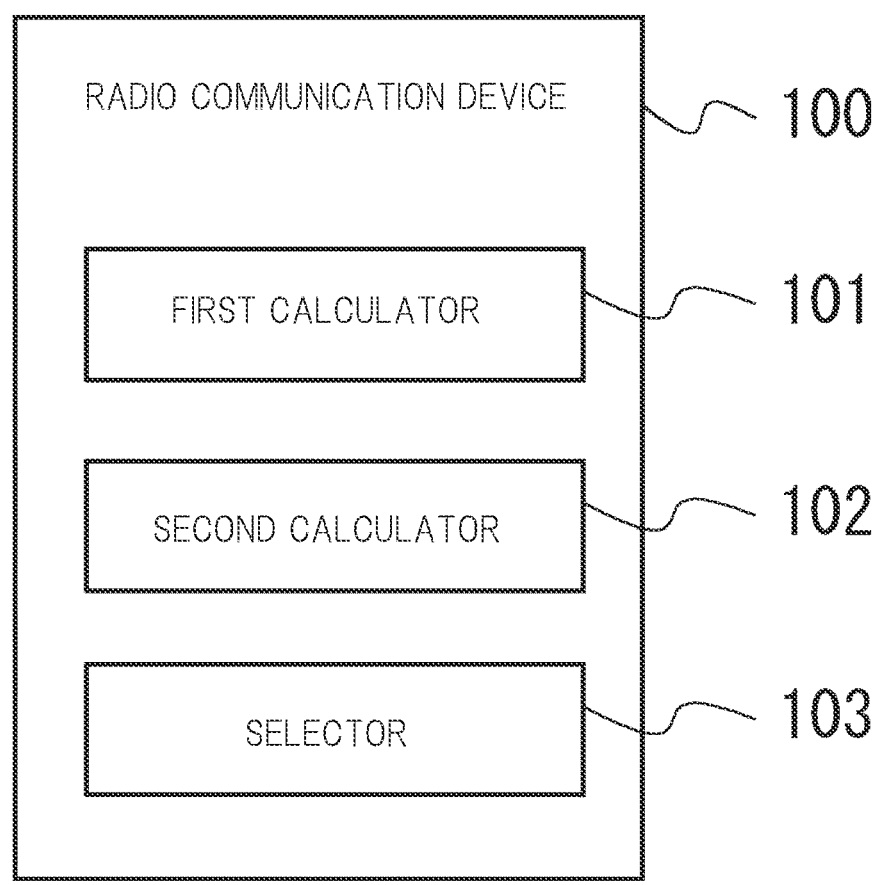
FIG. 2 is a functional block diagram of the radio communication device according the present first embodiment.

FIG. 2 is a functional block diagram of the radio communication device 100 according to the present first embodiment. The radio communication device 100 includes a first calculator 101, a second calculator 102 and a selector 103. The first calculator 101 calculates a transmission quality indicator value (such as the above-described "ETX") of each parent candidate node on the basis of a transmission frame transmitted from an own device (the radio communication device 100) to each of the plurality of parent candidate nodes. The second calculator 102 calculates a reception quality indicator value (referred to as "RCV" in some cases) of each parent candidate node on the basis of a reception frame transmitted from each of the plurality of parent candidate nodes and received at the own device. The selector 103 selects the parent node for use in the communication path among the plurality of parent candidate nodes on the basis of the transmission quality indicator value and the reception quality indicator value. Since the reception quality indicator value is used in addition to the transmission quality indicator value as described above, the calculation accuracy of the quality of the communication with the parent candidate nodes can be improved. Therefore, the suitable parent node can be selected.

Further, the second calculator 102 may calculate the reception quality indicator value based on the number of error-frame receptions that is the number of reception frames that have been detected as reception errors among the reception frames. In this manner, the reception quality indicator value can be more accurately calculated.

The second calculator 102 may calculate the reception quality indicator value so that the more the error frames having been detected as the reception error among the reception frames are, the worse the quality is. In this manner, the reception quality indicator value can be more accurately calculated.

The first calculator 101 may calculate the transmission quality indicator value on the basis of the number of times of the check response receptions. In this manner, the transmission quality indicator value can be more accurately calculated.

Further, the first calculator 101 may calculate the transmission quality indicator value by using a transmission frame and the check response for this transmission frame. The second calculator 102 may calculate the reception quality indicator value by taking a frame as the reception frame, the frame having been transmitted from each of the plurality of parent candidate nodes to the radio communication device 100 to be assigned as the destination and been received at the radio communication device 100. In this manner, the communication quality with the parent candidate node can be further improved.

The second calculator 102 may calculate the reception quality indicator value by taking a unicast frame as the reception frame, the unicast frame having been transmitted from each of the plurality of parent candidate nodes to the radio communication device 100. Since the reception quality indicator value is calculated by the usage of the frame that is relatively frequently received, the communication quality can be more improved.

Further, the second calculator 102 may take a CRC (Cyclic Redundancy Check) error as the reception error. In this manner, the reception error can be correctly detected.

Still further, when the number of frames that are normally received among the reception frames is taken as the number of normal-reception frames, the second calculator 102 may calculate the reception quality indicator value by using the following formula 3.

Reception quality indicator value=(The number of normal-frame receptions+The number of error-frame receptions)/The number of normal-frame receptions×Coefficient   Formula 3

The selector 103 is desirable to calculate the rank candidate value of each parent candidate node, the rank candidate value being a candidate of a path selection indicator value in the radio communication device 100 in the case of taking each parent candidate node as the parent node, on the basis of the transmission quality indicator value and the reception quality indicator value, and desirable to select the parent node on the basis of the rank candidate value. Since the rank candidate value is calculated by the usage of the reception quality indicator value in addition to the transmission quality indicator value as described above, the calculation accuracy and the update frequency of the rank candidate value are improved, and therefore, the more suitable parent node can be selected.

Further, the selector 103 may calculate the rank candidate value of each parent candidate node by using the rank value that is the path selection indicator value of each parent candidate node and the transmission quality indicator value and the reception quality indicator value of this parent candidate node. In this manner, the calculation accuracy of the rank candidate value is more improved.

Further, the selector 103 may calculate the rank candidate value of each parent candidate node by using the following formula 4.

Rank candidate value=Rank value of parent candidate node+Transmission quality indicator value of parent candidate node×Transmission coefficient+Reception quality indicator value of parent candidate node×Reception coefficient   (Formula 4)

The reception frame may include a NS (Neighbor Solicitation) frame in the RPL. In this manner, the calculation accuracy and the update frequency of the rank candidate value are improved, and therefore, the more suitable parent node can be selected.

Figure 3:
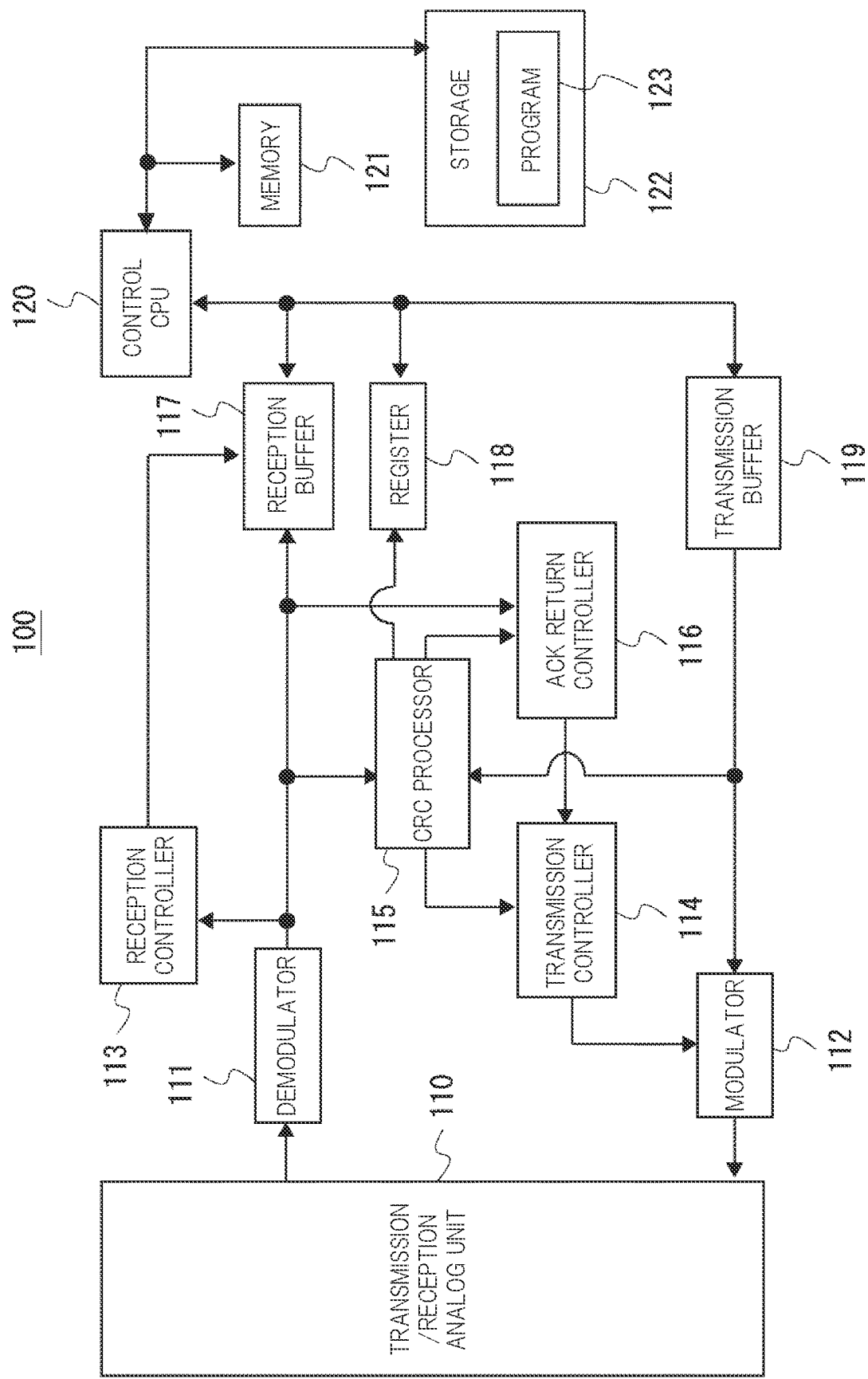
FIG. 3 is a block diagram showing a hardware configuration of the radio communication device according the present first embodiment.

FIG. 3 is a block diagram showing a hardware configuration of the radio communication device 100 according to the present first embodiment. The radio communication device 100 includes: a transmission/reception analog unit 110; a demodulator 111; a modulator 112; a reception controller 113; a transmission controller 114; a CRC processor 115; an ACK return controller 116; a reception buffer 117; a register 118; a transmission buffer 119; a control CPU 120; a memory 121; and a storage 122.

The transmission/reception analog unit 110 is connected to a radio antenna (although not illustrated), and is a RF (Radio Frequency) transmission/reception circuit for use in the radio communication. The transmission/reception analog unit 110 outputs a radio signal (RF analog data) that has been received at the radio antenna, to the demodulator 111. And, the transmission/reception analog unit 110 transmits a signal that has been transmitted at the transmission/reception analog unit 110, through the radio antenna.

The demodulator 111 converts the RF analog data that has been transmitted from the transmission/reception analog unit 110, into digital data, and outputs the data. The reception controller 113 controls the digital data that has been output from the demodulator 111 so as to be stored in the reception buffer 117. The reception buffer 117 is a storage region that temporarily stores the digital data (reception data) that has been output from the demodulator 111 in accordance with the control (instruction) of the reception controller 113. The transmission buffer 119 is a storage region that temporarily stores the transmission-target digital data (transmission data) that has been output from the control CPU 120.

The CRC processor 115 calculates the CRC data by using the reception data that has been output from the demodulator 111 and extracts the CRC field by using the reception data, compares values of the calculated CRC data and the extracted CRC field, and determines whether the reception frame has been normally received or is the CRC error. If the reception frame has been normally received, the CRC processor 115 notifies the transmission controller 114 and the ACK return controller 116 of the normal reception. If the reception frame is the CRC error, the CRC processor 115 stores the determination of the CRC error into the register 118. For example, the CRC processor 115 turns ON a flag indicating the CRC error. The CRC processor 115 calculates the CRC data by using the digital data that is stored in the transmission buffer 119, and outputs the calculated CRC data to the transmission controller 114.

When the device of the ACK return controller 116 is assigned to be the destination for the reception data that has been output from the demodulator 111 and when the ACK return controller 116 is notified of the normal reception by the CRC processor 115, the ACK return controller 116 creates an ACK frame, of which the destination is assigned to be the transmission source of the reception data, and instructs the transmission controller 114 to output the data.

The transmission controller 114 controls (instructs) the modulator 112 to transmit the digital data that has been stored in the transmission buffer 119. At this time, the transmission controller 114 instructs the modulator 112 that the CRC data transmitted from the CRC processor 115 should be contained in the transmission data. The transmission controller 114 instructs the modulator 112 to return the ACK frame that has been transmitted from the ACK return controller 116.

The modulator 112 acquires the digital data from the transmission buffer 119 in accordance with the control (instruction) of the transmission controller 114, converts this data into the RF analog data, and outputs the data to the transmission/reception analog unit 110. In this case, the modulator 112 converts the data into the analog data after setting the CRC data transmitted from the transmission controller 114 onto the CRC field for the transmission data. When receiving the instruction of the ACK-frame return from the transmission controller 114, the modulator 112 converts the ACK frame having the assigned destination into the analog data, and outputs the data to the transmission/reception analog unit 110.

The control CPU 120 is connected to the reception buffer 117, the register 118, the transmission buffer 119, the memory 121 and the storage 122. The memory 121 is a storage region for temporarily storing the target data to be processed by the control CPU 120. The storage 122 is a storage device for storing a program 123 implemented with various processing according to the present first embodiment. The storage 122 is a storage device such as a hard disc, a flash memory or others.

The control CPU1 120 loads the program 123 from the storage 122 to the memory 121, and executes the program 123. In this manner, the control CPU 120 exerts functions including the first calculator 101, the second calculator 102 and the selector 103.

The control CPU 120 counts the number of times of the unicast-frame transmission (that is the number of frame transmissions) of each transmission destination, and stores the number of counts in the memory 121. And, the control CPU 120 counts the number of times of ACK-frame reception (that is the number of ACK-frame receptions) of each transmission destination of the unicast frame, the number of ACK-frame receptions being the check response for the unicast frame, and stores the number of counts in the memory 121. Therefore, the control CPU 120 may make a correspondence between the number of frame transmissions and the number of ACK-frame receptions to be paired, and store the pair in the memory 121.

When the control CPU 120 receives the unicast frame, of which the destination is assigned to be the own device, the control CPU 120 refers to the register 118, and determines whether the received unicast frame is the CRC error. If it is the CRC error, the control CPU 120 counts the number of error-frame receptions at the destination source of the received unicast frame, and stores the number of counts in the memory 121. On the other hand, if the reception is normal, the control CPU 120 counts the number of normal-frame receptions at the destination source of the received unicast frame, and stores the number of counts in the memory 121. Therefore, the control CPU 120 may make a correspondence between the number of error-frame receptions and the number of normal-frame receptions of each transmission source to be paired, and store the pair in the memory 121. Note that the number of frame receptions including the normal reception and the error reception may be counted and stored in place of the number of normal-frame receptions. The received unicast frame, of which the destination is assigned to be the own device, may include the ACK frame.

Figure 4:
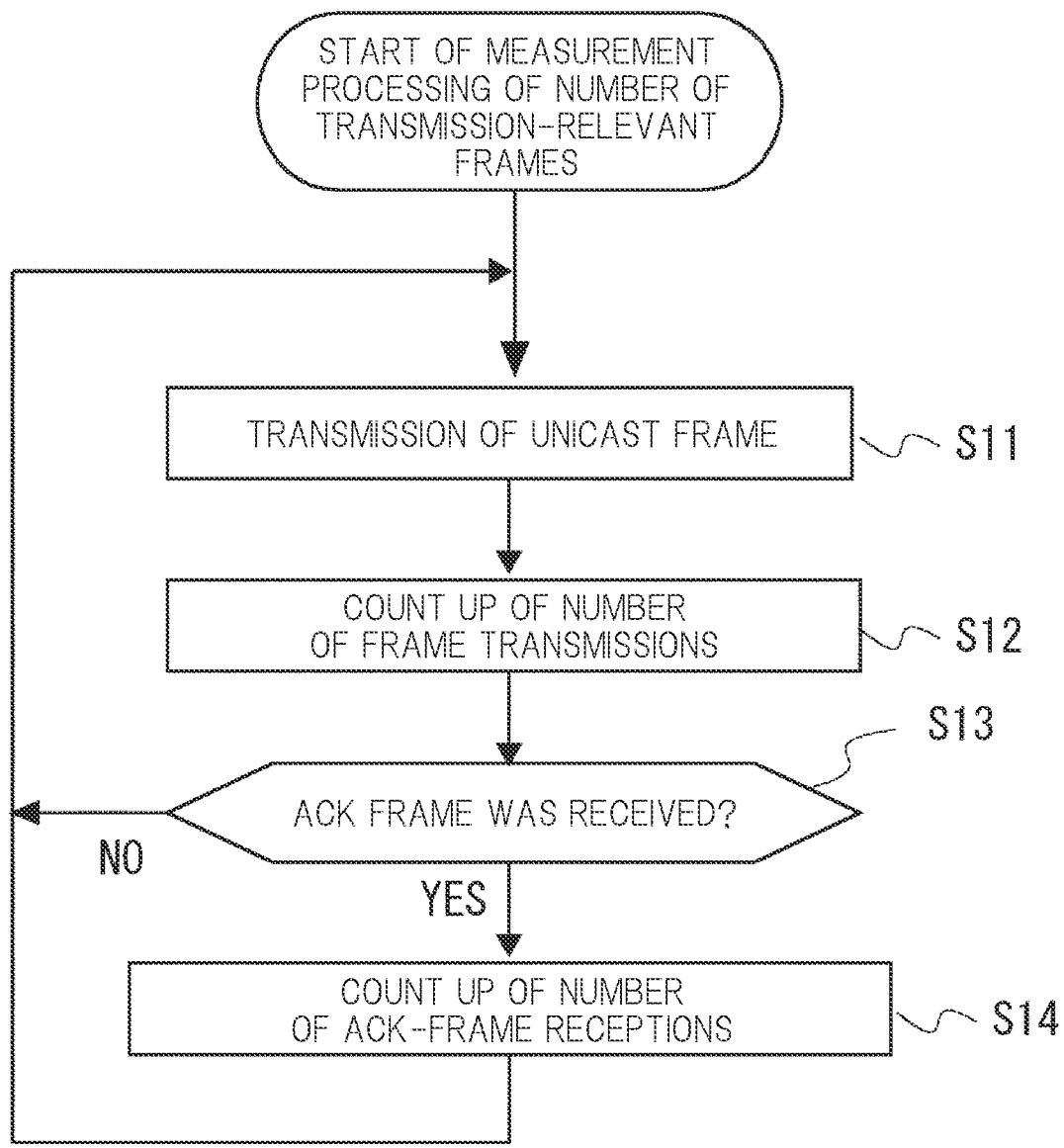
FIG. 4 is a flowchart showing a flow of a measurement processing of the number of transmission-relevant frames according the present first embodiment.

FIG. 4 is a flowchart showing a flow of a measurement processing of the number of transmission-relevant frames according to the present first embodiment. In this case, the radio communication device 100 is assumed to be the node N4, and the parent candidate nodes are assumed to be the nodes N1 to N3. First, the node N4 transmits the unicast frame (S11). For example, the node N4 transmits the NS frame, of which the destination is assigned to be the node N1. In this case, in accordance with a DIO (DODAG (Destination Oriented Directed Acyclic Graph) Information Object) frame transmitted from the node N1 and received at the node N4, the node N4 may transmit the NS frame to the node N1 that is a transmission source of the DIO frame.

Next, the node N4 counts up the number of NS-frame transmissions of the node N1 (S12). Subsequently, the node N4 determines whether the node N4 has received the ACK frame from the node N1 (S13). When receiving the ACK frame from the node N1 within predetermined time, the node N4 counts up the number of ACK-frame receptions of the node N1 (S14). After the step S14, or if the node N4 has not received the ACK frame within the predetermined time in the step S13, the flow returns to the step S11.

Even when the node N4 transmits the NS frame, of which the destination is assigned to be the nodes N2 and N3, the node N4 performs the same processing. In other words, the memory 121 stores the pair of the number of frame transmissions and the number of ACK-frame receptions of the node N1, the pair of the number of frame transmissions and the number of ACK-frame receptions of the node N2 and the pair of the number of frame transmissions and the number of ACK-frame receptions of the node N3.

Figure 5:
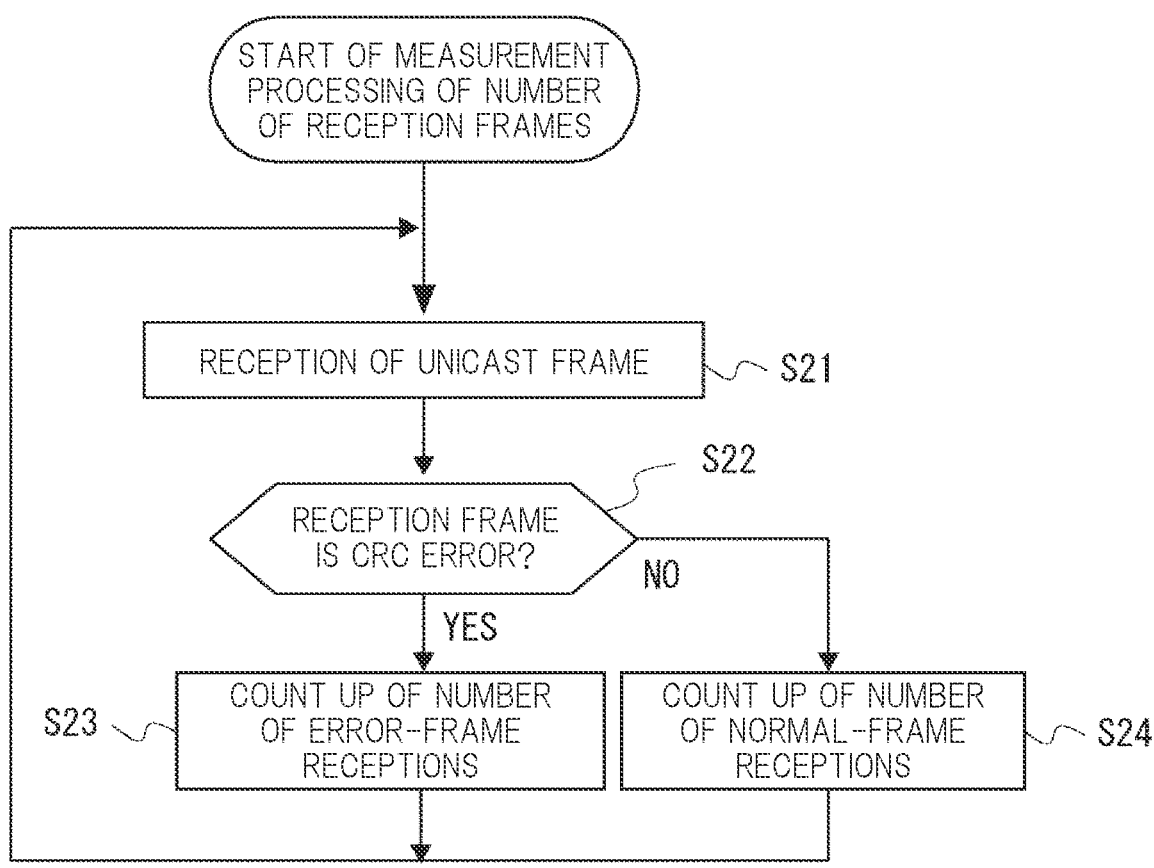
FIG. 5 is a flowchart showing a flow of a measurement processing of the number of reception frames according the present first embodiment.

FIG. 5 is a flowchart showing a flow of a measurement processing of the number of reception frames according to the present first embodiment. First, the node N4 receives the unicast frame, of which the destination is assigned to be the node N4 (S21). For example, the node N4 is assumed to transmit the DIO frame that is the multicast frame, of which the destination is assigned to be the nodes N1, N2 and N3, and receive the NS frame that is the unicast frame from the node N1.

Next, the node N4 checks the CRC field of the received unicast frame (reception frame), and determines whether the reception is the CRC error (S22). If it is determined that the reception is the CRC error, the node N4 counts up the number of error frames of the transmission source (S23). On the other hand, if it is determined in the step S22 that the reception is not the CRC error, in other words, it is determined that the reception frame has been normally received, the node N4 counts up the number of normal-frame receptions of the transmission source (S24). After the step S23 or S24, the flow returns to the step S21.

Even when the node N4 receives the NS frame, of which the destination source is assigned to be the nodes N2 and N3, the node N4 performs the same processing. In other words, the memory 121 stores the pair of the number of error-frame receptions and the number of normal-frame receptions of the node N1, the pair of the number of error-frame receptions and the number of normal-frame receptions of the node N2 and the pair of the number of error-frame receptions and the number of normal-frame receptions of the node N3.

Figure 6:
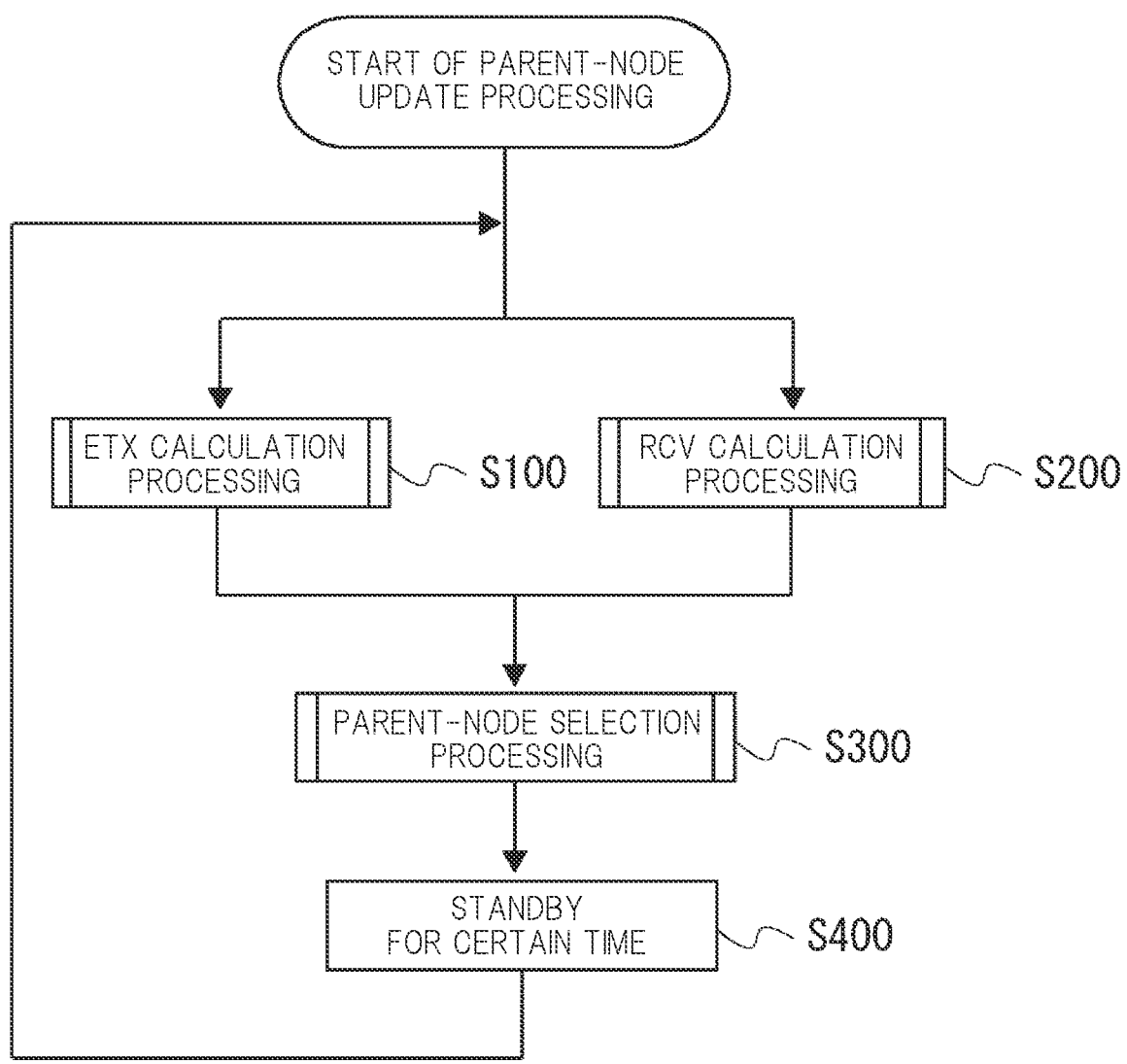
FIG. 6 is a flowchart showing a flow of a parent-node update processing according the present first embodiment.

FIG. 6 is a flowchart showing a flow of a parent-node update processing according to the present first embodiment.

First, the node N4 performs an ETX calculation processing (S100) and a RCV calculation processing (S200). Note that the steps S100 and S200 are not necessarily executed in parallel, and may be independently executed.

Figure 7:
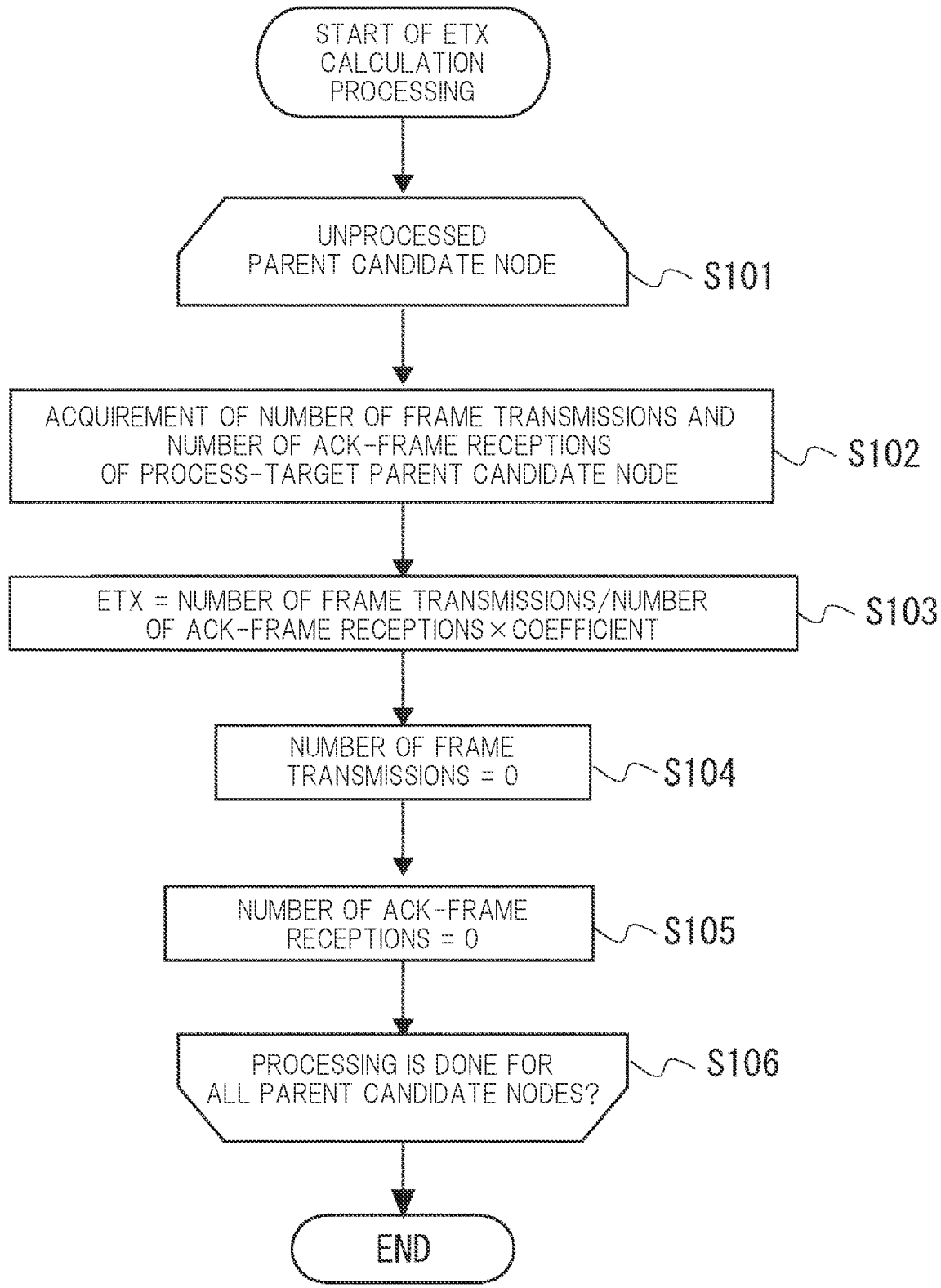
FIG. 7 is a flowchart showing a flow of an ETX calculation processing according the present first embodiment.

FIG. 7 is a flowchart showing a flow of the ETX calculation processing according to the present first embodiment. First, the node N4 selects a parent candidate node, of which the ETX calculation processing is unprocessed, among the nodes N1 to N3 that are the parent candidate nodes (S101). For example, the node N1 is assumed to be selected as the process-target parent candidate node.

Next, the node N4 acquires the number of frame transmissions and the number of ACK-frame receptions of the process-target parent candidate node (S102). For example, from the memory 121, the node N4 reads out the pair of the number of frame transmissions and the number of ACK-frame receptions of the node N1.

Then, the node N4 calculates the ETX of the node N1 by using, for example, the above-described formula 1 (S103). Note that the coefficient in the formula 1 is "128". However, the coefficient is not limited to this. Then, the node N4 stores the calculated ETX into the memory 121 so as to correspond to the node N1.

Then, the node N4 clears the number of frame transmissions to be "0", the number corresponding to the node N1 inside the memory 121 (S104). And, the node N4 clears the number of ACK-frame receptions to be "0", the number corresponding to the node N1 inside the memory 121 (S105). Note that an order of the steps S104 and S105 is not limited.

Then, the node N4 determines whether the ETX calculation processing is done for all the parent candidate nodes (S106). In this case, since the nodes N2 and N3 are unprocessed, the flow returns to the step S101. Then, for example, the node N4 selects the node N2 as the process target in the step S101, and executes the steps S102 to S105. The same goes for a case of selection of the node N3.

If it is determined in the step S106 that the ETX calculation processing is done for all the parent candidate nodes, the ETX calculation processing ends.

Figure 8:
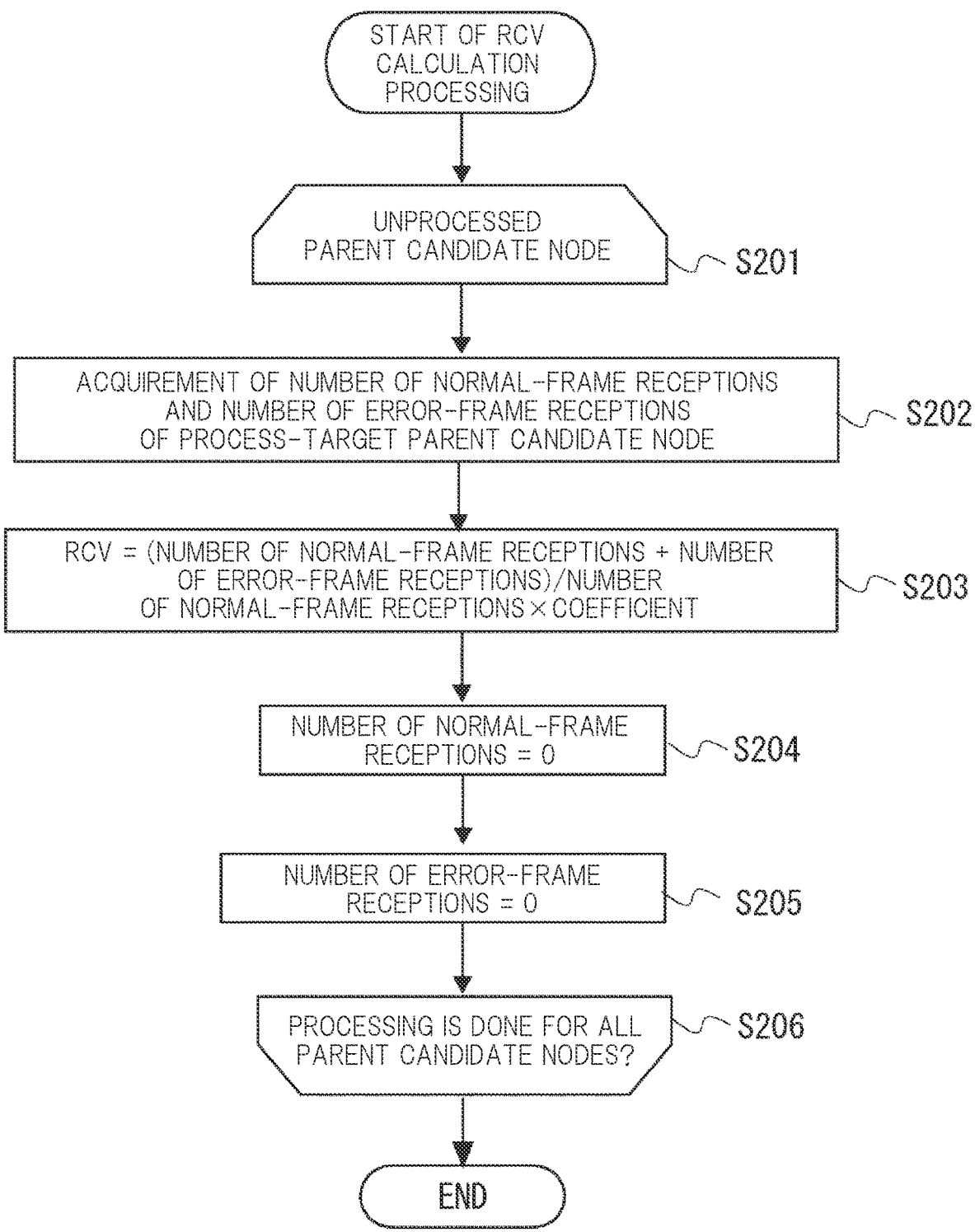
FIG. 8 is a flowchart showing a flow of an RCV calculation processing according the present first embodiment.

FIG. 8 is a flowchart showing a flow of the RCV calculation processing according to the present first embodiment. First, the node N4 selects a parent candidate node, of which the RCV calculation processing is unprocessed, among the nodes N1 to N3 that are the parent candidate nodes (S201). For example, the node N1 is assumed to be selected as the process-target parent candidate node.

Next, the node N4 acquires the number of normal-frame receptions and the number of error-frame receptions of the process-target parent candidate node (S202). For example, from the memory 121, the node N4 reads out the pair of the number of normal-frame receptions and the number of error-frame receptions of the node N1.

Then, the node N4 calculates the RCV of the node N1 by using, for example, the above-described formula 3 (S203). Note that the coefficient in the formula 3 is "128". However, the coefficient is not limited to this. Then, the node N4 stores the calculated RCV into the memory 121 so as to correspond to the node N1.

Then, the node N4 clears the number of normal-frame receptions to be "0", the number corresponding to the node N1 inside the memory 121 (S204). And, the node N4 clears the number of error-frame receptions to be "0", the number corresponding to the node N1 inside the memory 121 (S205). Note that an order of the steps S204 and S205 is not limited.

Then, the node N4 determines whether the RCV calculation processing is done for all the parent candidate nodes (S206). In this case, since the nodes N2 and N3 are unprocessed, the flow returns to the step S201. Then, for example, the node N4 selects the node N2 as the process target in the step S201, and executes the steps S202 to S205. The same goes for a case of selection of the node N3.

If it is determined in the step S206 that the RCV calculation processing is done for all the parent candidate nodes, the RCV calculation processing ends.

Back to FIG. 6, and the explanation will be continued. After the steps S100 and S200, the node N4 performs the parent-node selection processing (S300).

Figure 9:
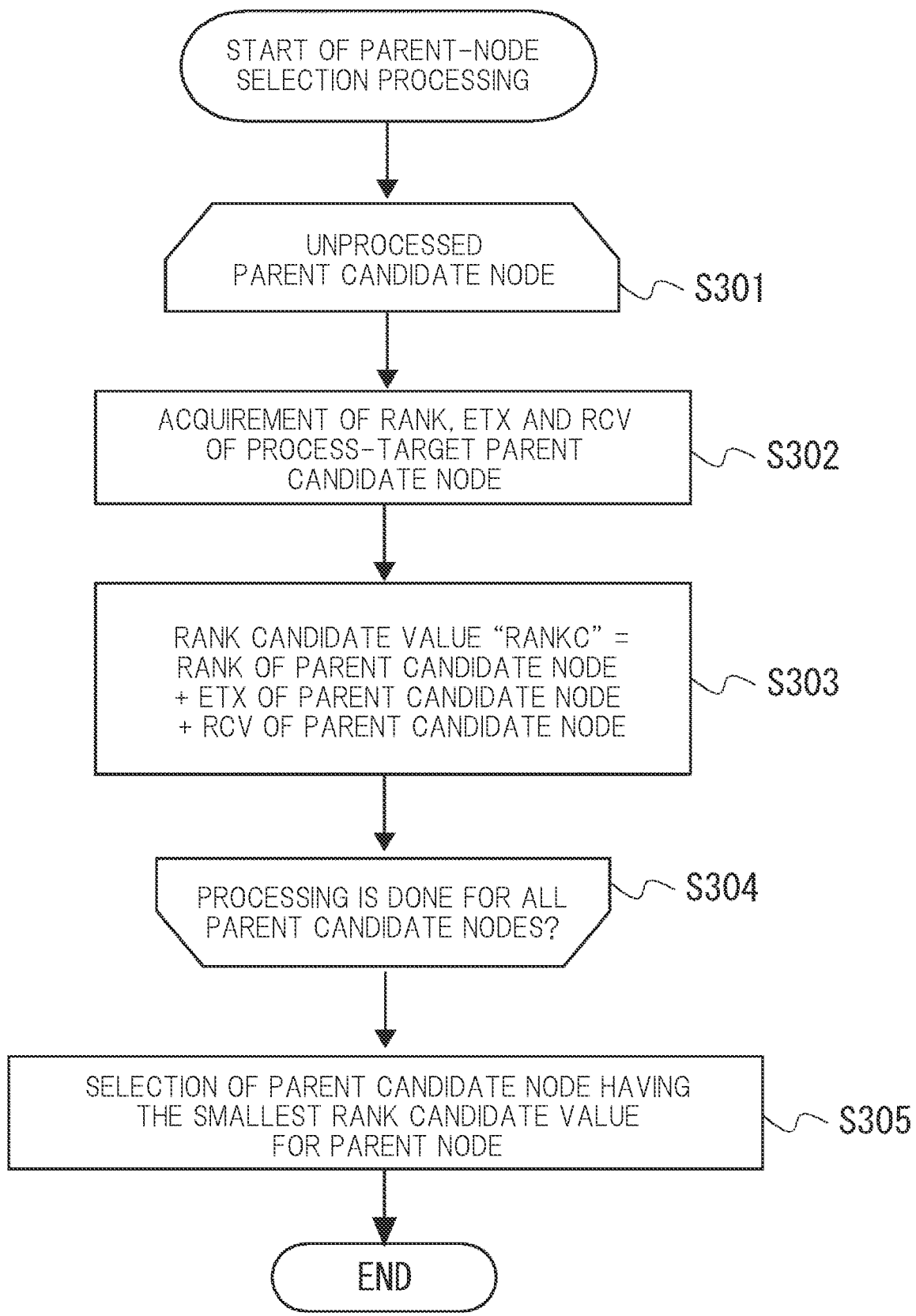
FIG. 9 is a flowchart showing a flow of a parent-node selection processing according the present first embodiment.

FIG. 9 is a flowchart showing a flow of the parent-node selection processing according to the present first embodiment. First, the node N4 selects a parent candidate node, of which the rank-candidate-value calculation processing is unprocessed, among the nodes N1 to N3 that are the parent candidate nodes (S301). For example, the node N1 is assumed to be selected as the process-target parent candidate node.

Next, the node N4 acquires the rank (referred to as "RANK" below), the ETX and the RCV of the process-target parent candidate node (S302). For example, from the memory 121, the node N4 reads out the ETX and the RCV of the node N1. In the memory 121, the node N4 previously stores the RANK contained in the DIO frame transmitted from the node N1 and received at the own device, and the node N4 is assumed to read out the rank of the node N1 from the memory 121.

Then, the node N4 calculates the rank candidate value in the case of taking the node N1 as the mater node, by using, for example, the above-described formula 4 (S303). In this case, the transmission and reception coefficients in the formula 4 are "0". However, the coefficients are not limited to this.

Then, the node N4 determines whether the rank-candidate-value calculation processing is done for all the parent candidate nodes (S304). In this case, since the nodes N2 and N3 are unprocessed, the flow returns to the step S301. Then, for example, the node N4 selects the node N2 as the process target in the step S301, and repeats the steps S302 to S303. The same goes for a case of selection of the node N3.

If it is determined in the step S304 that the rank-candidate-value calculation processing is done for all the parent candidate nodes, the node N4 compares the calculated rank candidate values of the respective parent candidate nodes in the step S303. Then, the node N4 selects the parent candidate node having the smallest rank candidate value as the parent node (S305). Then, the node N4 sets the calculated rank candidate value of the selected parent candidate node to be the rank of the own node. Then, the parent-node selection processing ends.

Back to FIG. 6, and the explanation will be continued. After the step S300, the node N4 stands by for certain time (S400), and the flow returns to the steps S100 and S200.

Figure 10:
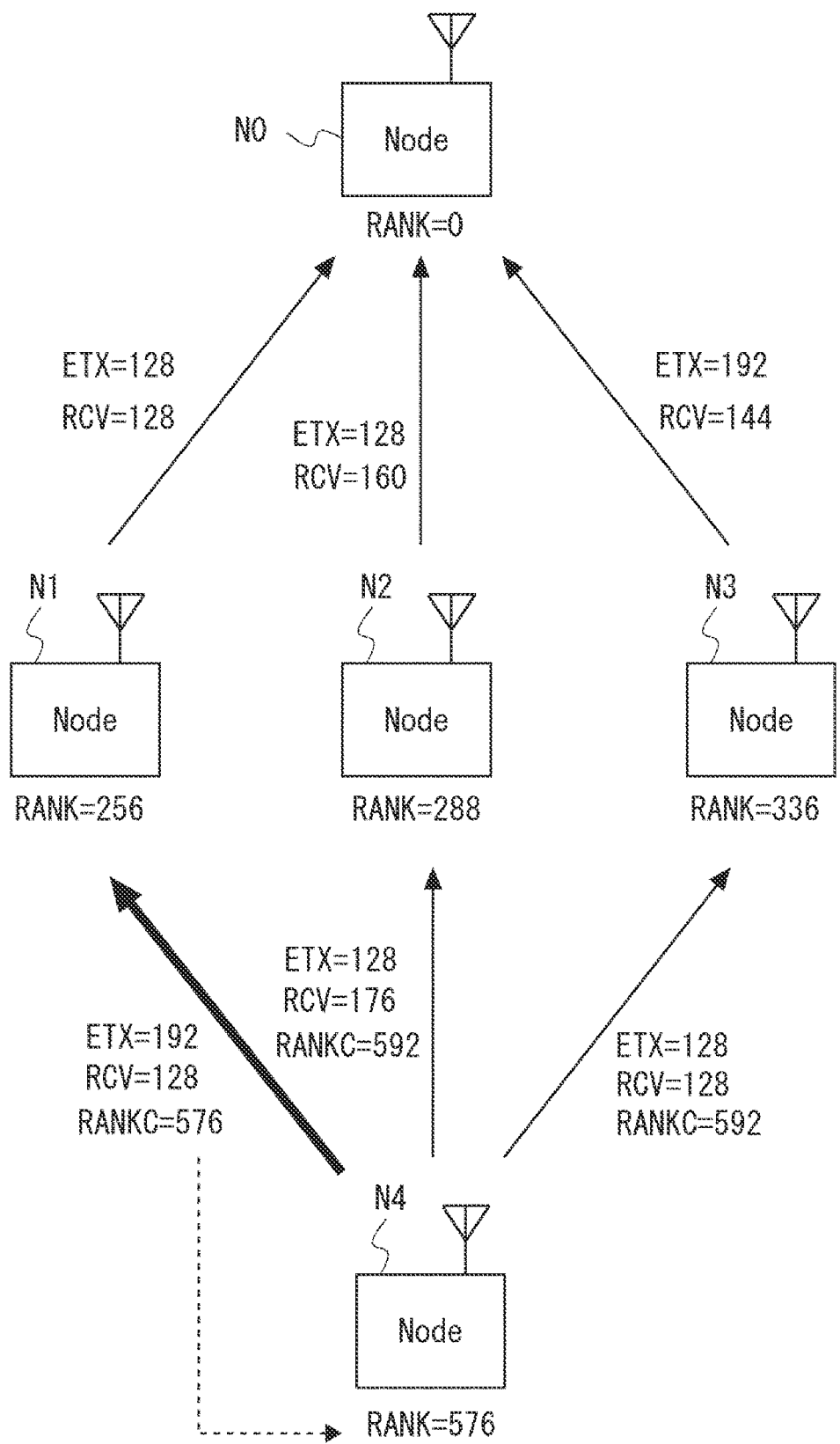
FIG. 10 is a diagram showing an example of selection for a parent node according the present first embodiment.

FIG. 10 is a diagram showing a selection example of the parent node according to the present first embodiment. In this case, first, the node N0 is assumed to be selected as the parent node of each of the nodes N1 to N3, and the ranks are assumed to be "256", "288" and "336". In this state, the node N4 is assumed to perform the parent-node selection processing while taking the nodes N1 to N3 as the parent candidate nodes. In FIG. 10, the node N4 calculates the rank candidate value of the node N1 to be "576", the rank candidate value of the node N2 to be "592", and the rank candidate value of the node N3 to be "592". Therefore, the node N4 selects the node N1 having the smallest rank candidate value of "576" as the parent node, and sets the rank of the node N4 to be "576".

In this process, when only the ETX is used (the RCV is not used) as explained in the related art, the ranks of the nodes N1 to N3 are "128", "128" and "192". Therefore, there is no difference in the rank between the nodes N1 and N2. And, the rank candidate values of the nodes N1 to N3 calculated by the node N4 are "128+192=320", "128+128=256", and "192+128=320". Therefore, the node N2 has the smallest rank candidate value, and is selected as the parent node of the node N4. However, the actual reception quality is better in the node N1 than the node N2.

Accordingly, in the present embodiment, the RCV is also taken in consideration. Therefore, the node N1 is the smallest at the stage of the rank for the parent candidate node as described above, and besides, the difference in the RCV is also reflected on the rank candidate value in the communication between the parent candidate node and the child node (N4). Therefore, the node N1 comprehensively having the best communication quality can be selected as the parent node of the node N4.

Particularly, since the frequency of the transmission of the ETX-calculation-target frame is relatively low, it can be said that the related art causes the too large influence of the deterioration of the ETX due to the ACK reception error on the communication quality. On the other hand, when the unicast frame containing the information of the destination that is the own node transmitted from the parent candidate node is the RCV-calculation-target frame, the number of rank-candidate-value calculation target frames is larger than the number of the same in the case using only the ETX, and thus, the calculation accuracy is improved.

Because of this, the RCV is updated for every unicast-frame reception, and therefore, the rank candidate value can be accordingly updated. Therefore, the frequency of the update of the parent node can be improved, and the selection of the suitable parent node can be maintained.

In the case using only the ETX, even if there is no difference in the rank of the parent candidate node, the difference in the rank can be made by taking the RCV into consideration, and the communication quality can be more accurately measured.

Second Embodiment

The present second embodiment is a modification example of the above-described first embodiment. In the present second embodiment, the multicast frame containing the information of the destination that is the own node and transmitted from the parent candidate node is used as the target for counting the number of frames in the calculation of the reception quality indicator value (RCV). In other words, the second calculator 102 calculates the reception quality indicator value by using, as the reception frame, the multicast frame containing the information of the destination that is the radio communication device 100 and transmitted from each of the plurality of parent candidate nodes. In this manner, the number of frame types of the RCV calculation target increases, and the calculation accuracy of the RCV is improved.

Particularly, the reception frame may include at least a part of a PA (PAN Advertisement) frame, a PC (PAN Configuration) frame and the DIO frame in the RPL. In this manner, the calculation accuracy of the RCV can be improved in accordance with the standards of the RPL.

Note that the configuration of the radio communication device 100 according to the present second embodiment is the same as those of FIGS. 2 and 3, and therefore, the illustration of the same is omitted, and the explanation for the common processing is also omitted.

Figure 11:
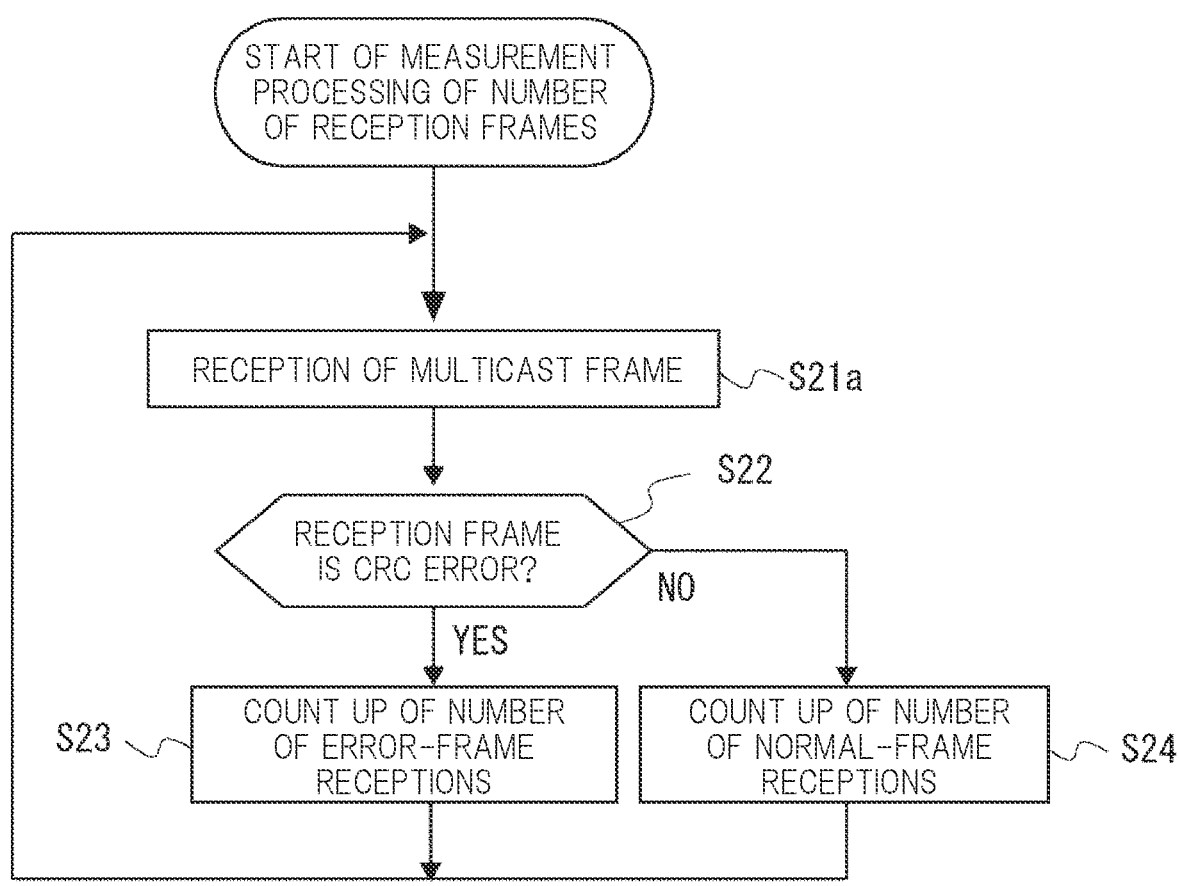
FIG. 11 is a flowchart showing a flow of a measurement processing of the number of reception frames according the present second embodiment.

FIG. 11 is a flowchart showing a flow of a measurement processing of the number of reception frames according to the present second embodiment. First, the node N4 receives the multicast frame containing the information of the destination that is the node N4 (S21a). For example, the node N4 receives the multicast frame containing the information of the destination that is the node N4 from any of the nodes N1, N2 and N3. In this case, the multicast frame is better to be, for example, the PA frame, the PC frame and the DIO frame in the RPL. However, the frame is not limited to them.

Then, the node N4 executes the steps S22 to S24 while taking the multicast frame as the reception frame. In other words, it is determined whether each of the PA frame, the PC frame and the DIO frame is the CRC error, and the number of error-frame receptions and the number of normal-frame receptions regarding the PA frame, the PC frame and the DIO frame are collectively counted.

In the manner, after that, the parent-node update processing can be executed as similar to the first embodiment. Therefore, the same effects as those of the first embodiment are obtained. Further, in the second embodiment, since the number of the frame types of the RCV calculation target increases, the RCV calculation accuracy is improved. Particularly, since the multicast frame is used, the information of the communication quality with the parent candidate node that is not being used as the communication path can be updated. Therefore, the parent candidate node having the higher communication quality can be selected as the parent node.

Third Embodiment

The present third embodiment is a combination example of the above-described first and second embodiments. In the present second embodiment, both the multicast frame and unicast frame containing the information of the destination that is the own node and transmitted from the parent candidate node are used as the target for counting the number of frames in the calculation of the reception quality indicator value (RCV). In other words, the second calculator 102 calculates the reception quality indicator value by taking, as the reception frame, the multicast frame and unicast frame containing the information of the destination that is the radio communication device 100 and transmitted from each of the plurality of parent candidate nodes. In this manner, the number of frame types of the RCV calculation target increases, and the RCV calculation accuracy is improved.

Note that the configuration of the radio communication device 100 according to the present third embodiment is the same as those of FIGS. 2 and 3, and therefore, the illustration of the same is omitted, and the explanation for the common processing is also omitted.

Figure 12:
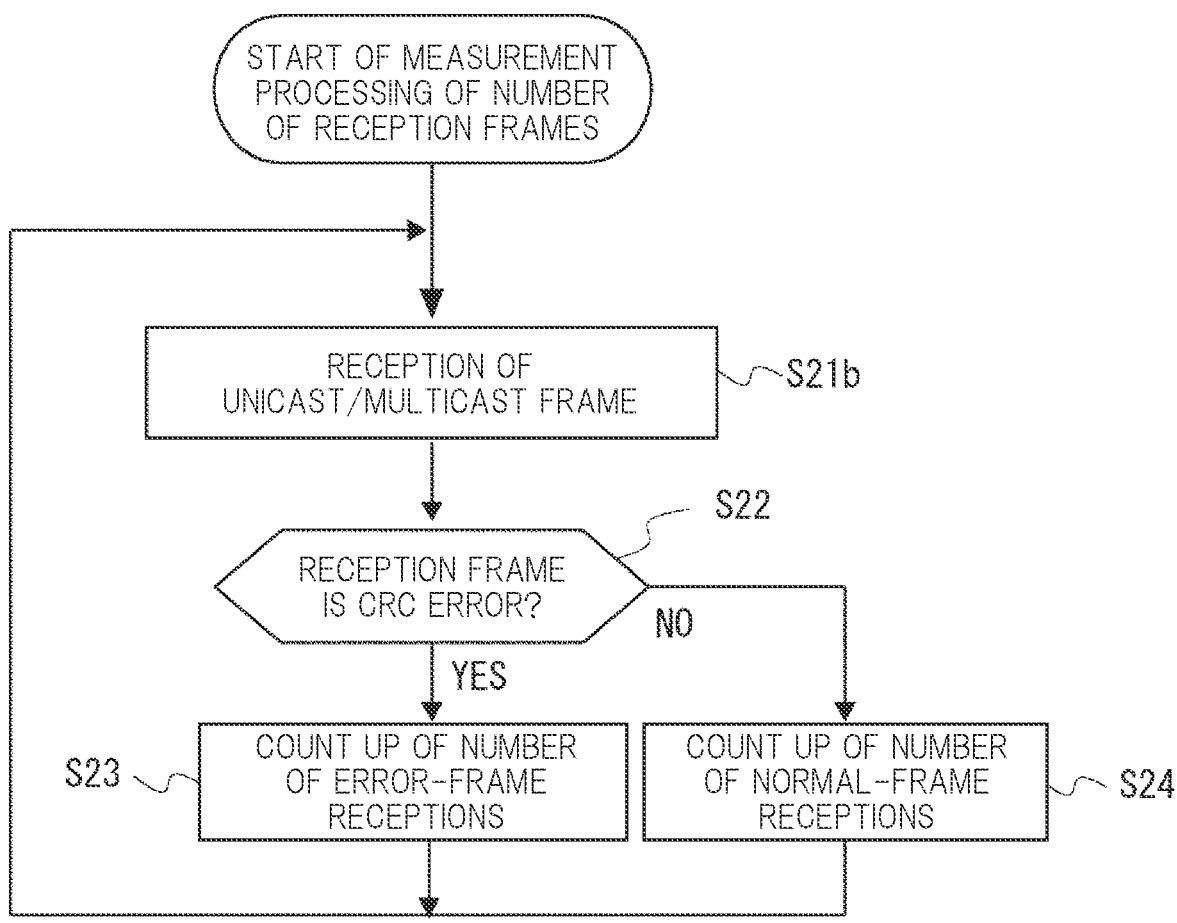
FIG. 12 is a flowchart showing a flow of a measurement processing of the number of reception frames according the present third embodiment.

FIG. 12 is a flowchart showing a flow of a measurement processing of the number of reception frames according to the present third embodiment. First, the node N4 receives the multicast frame or unicast frame containing the information of the destination that is the node N4 (S21b). For example, the node N4 receives the unicast frame containing the information of the destination that is the node N4 from any of the nodes N1, N2 and N3. In this case, the unicast frame is better to be the NS frame in the RPL. However, the frame is not limited to this. Alternatively, the node N4 receives the multicast frame containing the information of the destination that is the node N4 from any of the nodes N1, N2 and N3. In this case, the multicast frame is better to be, for example, the PA frame, the PC frame or the DIO frame in the RPL. However, the frame is not limited to them.

Then, the node N4 executes the steps S22 to S24 while collectively taking the multicast frame and unicast frame as the reception frame. In other words, it is determined whether each of the NS frame, the PA frame, the PC frame and the DIO frame is the CRC error, and the number of error-frame receptions and the number of normal-frame receptions regarding the NS frame, the PA frame, the PC frame and the DIO frame are collectively counted.

In the manner, after that, the parent-node update processing can be executed as similar to the first and second embodiments. Therefore, the same effects as those of the first and second embodiments are obtained. Further, in the third embodiment, since the number of the frame types of the RCV calculation target increases, the RCV calculation accuracy is improved. Therefore, the parent candidate node having the higher communication quality can be selected as the parent node.

Fourth Embodiment

The present fourth embodiment is another working example. The selector 103 according to the present fourth embodiment calculates a total value of the transmission quality indicator value and the rank value that is the path selection indicator of each parent candidate node, determines the parent candidate node having the best communication quality on the basis of the total value, and selects, as the parent node, the parent candidate node having the best communication quality in consideration of the reception quality indicator value if the number of the determined parent candidate nodes is plural. In this manner, the node having the favorable reception quality indicator value can be selected as the parent node among the parent candidate nodes having the favorable total value of the rank value and the transmission quality indicator value. Particularly, even when there is no difference in the rank candidate value in the related art, the communication quality can be appropriately determined.

Note that the configuration of the radio communication device 100 according to the present fourth embodiment is the same as those of FIGS. 2 and 3, and therefore, the illustration of the same is omitted, and the explanation for the common processing is also omitted. Note that the reception frame may be either one or both of the unicast frame and the multicast frame.

Figure 13:
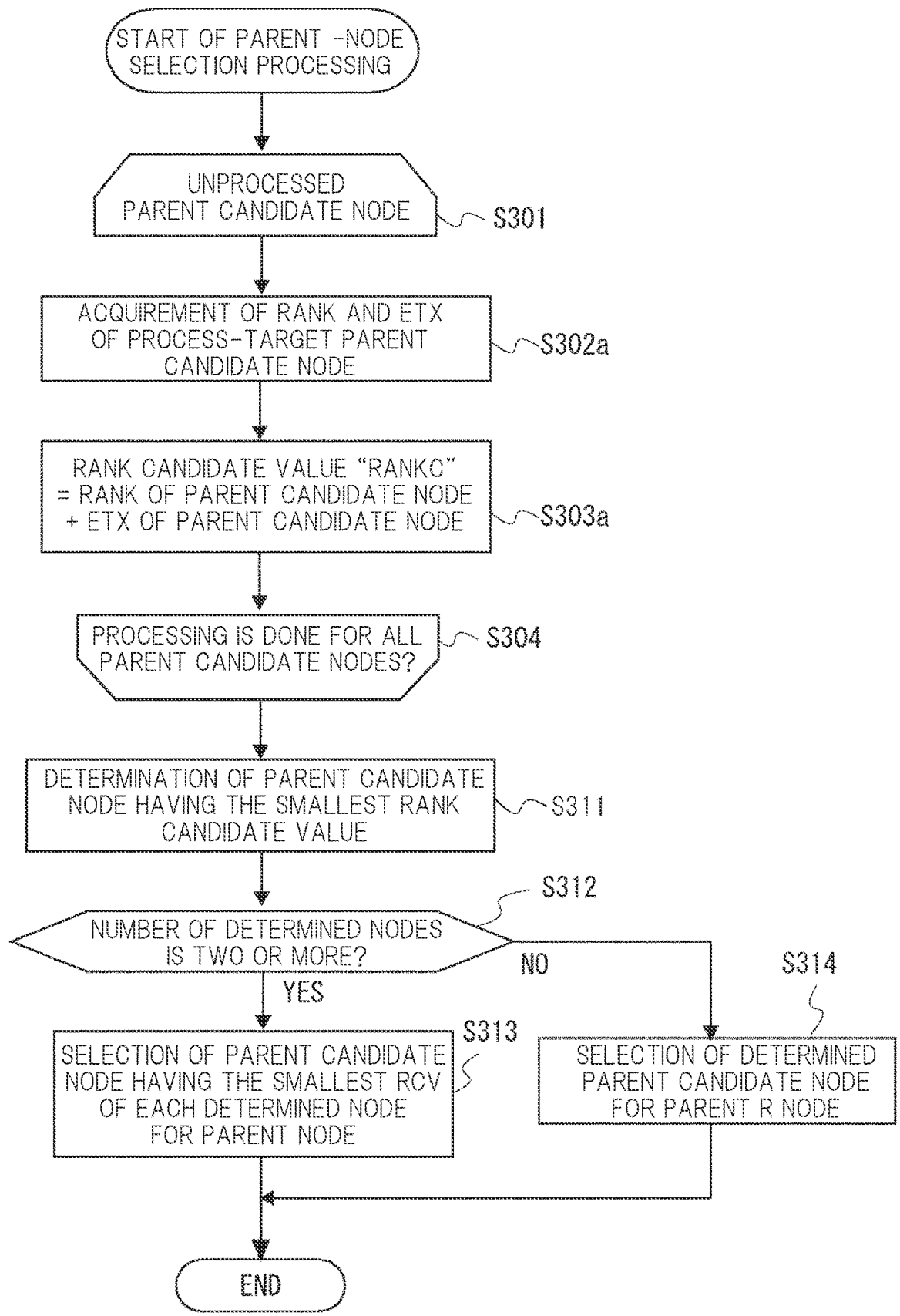
FIG. 13 is a flowchart showing a flow of a parent-node selection processing according the present fourth embodiment.

FIG. 13 is a flowchart showing a flow of a parent-node selection processing according to the present fourth embodiment. The assumption is that the processing in FIGS. 4 and 5 and the ETX calculation processing and the RCV calculation processing in FIG. 6 have been already executed.

First, the node N4 selects a parent candidate node, for which the rank-candidate-value calculation processing is unprocessed, among the nodes N1 to N3 that are the parent candidate nodes (S301). For example, the node N1 is assumed to be selected as the process-target parent candidate node.

Next, the node N4 acquires the rank and the ETX of the process-target parent candidate node (S302a). Then, the node N4 calculates the rank candidate value in the case of taking the node N1 as the parent node by using, for example, the above-described formula 2 (S303a). The rank candidate value in this case is the above-described total value. In this case, the transmission coefficient of the formula 2 is "0". However, the transmission coefficient is not limited to this.

Then, the node N4 determines whether the rank-candidate-value calculation processing is done for all the parent candidate nodes (S304). In this case, the nodes N2 and N3 are unprocessed, and therefore, the flow returns to the step S301. And, for example, the node N4 selects the node N2 as the process target in the step S301, and the steps S302 and S303 are repeated. The same goes for the selection of the node N3.

If it is determined in the step S304 that the rank-candidate-value calculation processing is done for all the parent candidate nodes, the node N4 compares the calculated rank candidate values of the respective parent candidate nodes in the step S303. Then, the node N4 determines the parent candidate node having the smallest rank candidate value (S311).

Then, the node N4 determines whether the number of the determined parent candidate nodes is two or more (S312). If it is determined that the number is two or more, the node N4 acquires the RCV values of the respective determined nodes, and selects the parent candidate node having the smallest RCV value as the parent node (S313). On the other hand, if it is determined in the step S312 that the number of the determined parent candidate nodes is not two or more, in other words, is one, the node N4 selects the determined parent candidate node as the parent node (S314).

Then, the node N4 calculates (updates) the rank candidate value of the selected parent candidate node by using the above-described formula 4 and the acquired RCV, and sets the calculated rank candidate value to be a rank of the own node.

Alternatively, the node N4 may calculate (update) the rank candidate value in the case of taking each node as the parent node by using the above-described formula 4 and the acquired RCV in the step S313, and may select a node having the updated smallest rank candidate value as the parent node.

Figure 14:
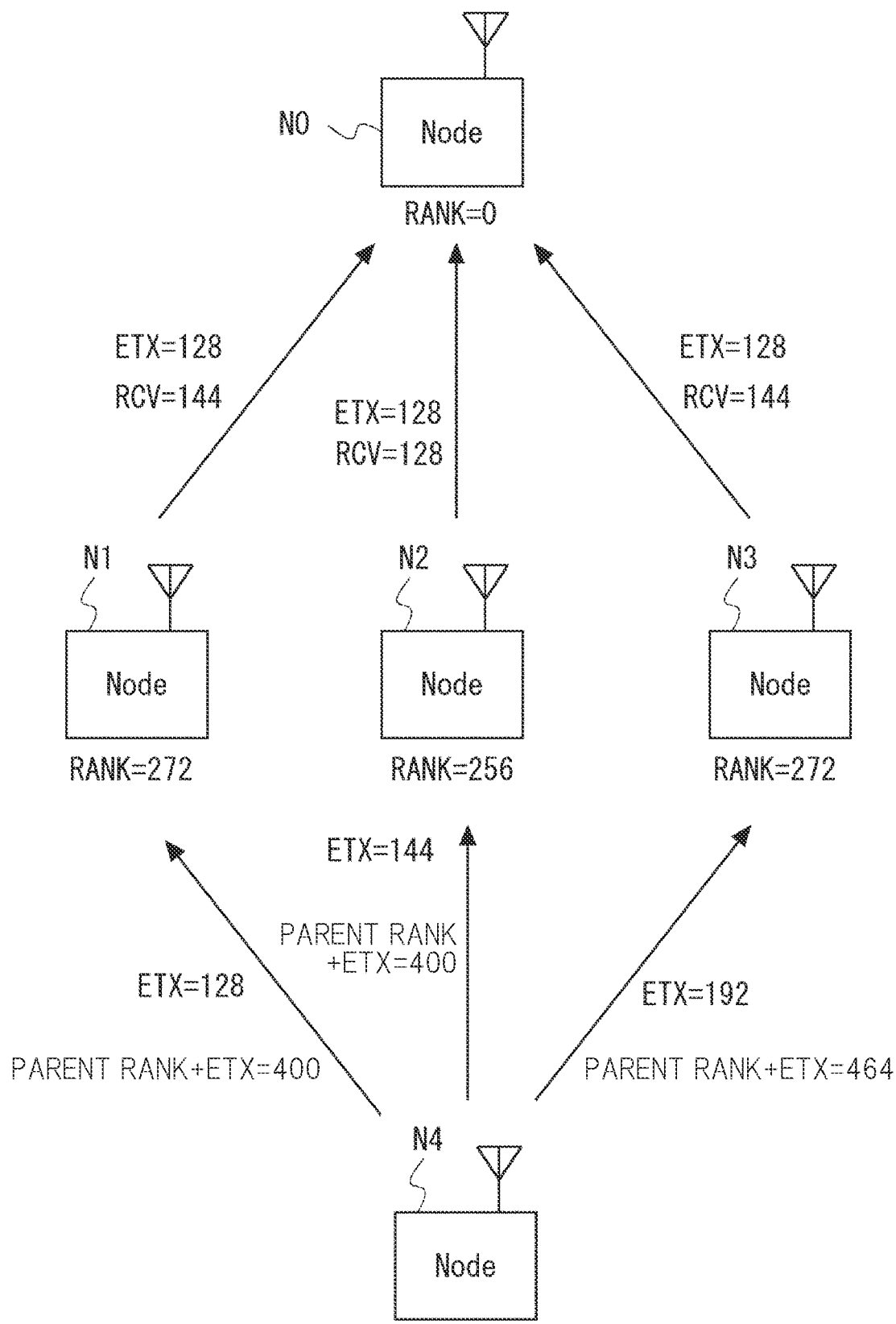
FIG. 14 is a diagram showing an example of selection for a parent node according the present fourth embodiment.

FIG. 14 is a diagram showing a selection example of a parent node according to the present fourth embodiment. The drawing shows a case in which the node N4 calculates the rank candidate value (the total value of the rank and the ETX of the parent candidate node) of each of the parent candidate nodes N1 to N3 in the step S303a. In this case, both the total values of the nodes N1 and N2 are "400" that is the smallest value. Therefore, the node N4 determines the nodes N1 and N2 in the step S311.

Figure 15:
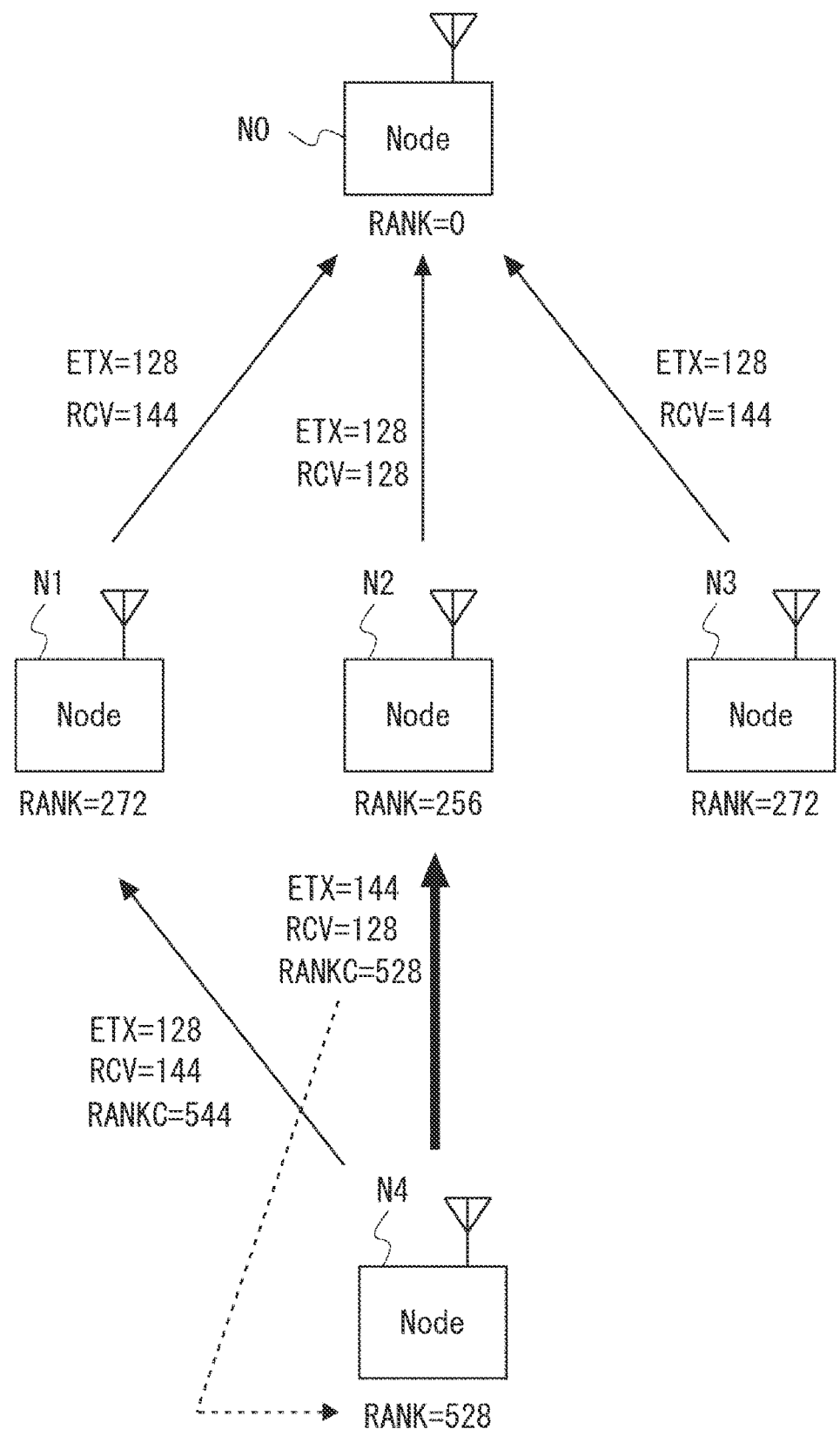
FIG. 15 is a diagram showing an example of selection for a parent node according the present fourth embodiment.

FIG. 15 is a diagram showing a selection example of a parent node according to the present fourth embodiment. The drawing shows that the node N4 acquires the RCV of the determined nodes N1 and N2, and then, selects the node N2 having the smaller RCV as the parent node. Alternatively, the node N4 may acquire the RCV of the determined nodes N1 and N2, update the rank candidate value by using the RCV, and select the node N2 having the smaller rank candidate value. Then, the node N4 sets the updated rank candidate value of the selected node N2 to be the rank of the own node.

As described above, according to the present fourth embodiment, the node having the favorable reception quality indicator value can be selected as the parent node among the parent candidate nodes each having the favorable total value of the rank value and the transmission quality indicator value.

Fifth Embodiment

The present fifth embodiment is a modification example of the above-described fourth embodiment. The selector 103 according to the present fifth embodiment calculates the total value (=rank value+ETX) after the first calculator 101 calculates the transmission quality indicator value of each parent candidate node. Then, if the number of the parent candidate nodes determined by the selector 103 is plural, the second calculator 102 calculates the reception quality indicator value of each of the plurality of determined parent candidate nodes. Then, the selector 103 selects the parent node among the plurality of determined parent candidate nodes on the basis of the reception quality indicator value. In this manner, the RCV calculation processing for the undetermined parent candidate node can be removed, and therefore, the process efficiency of the entire parent-node update processing can be improved.

Note that the configuration of the radio communication device 100 according to the present fourth embodiment is the same as those of FIGS. 2 and 3 described above, and therefore, illustration of this configuration is omitted, and the explanation for the common processing is also omitted. Note that the reception frame may be either one or both of the unicast frame and the multicast frame.

Figure 16:
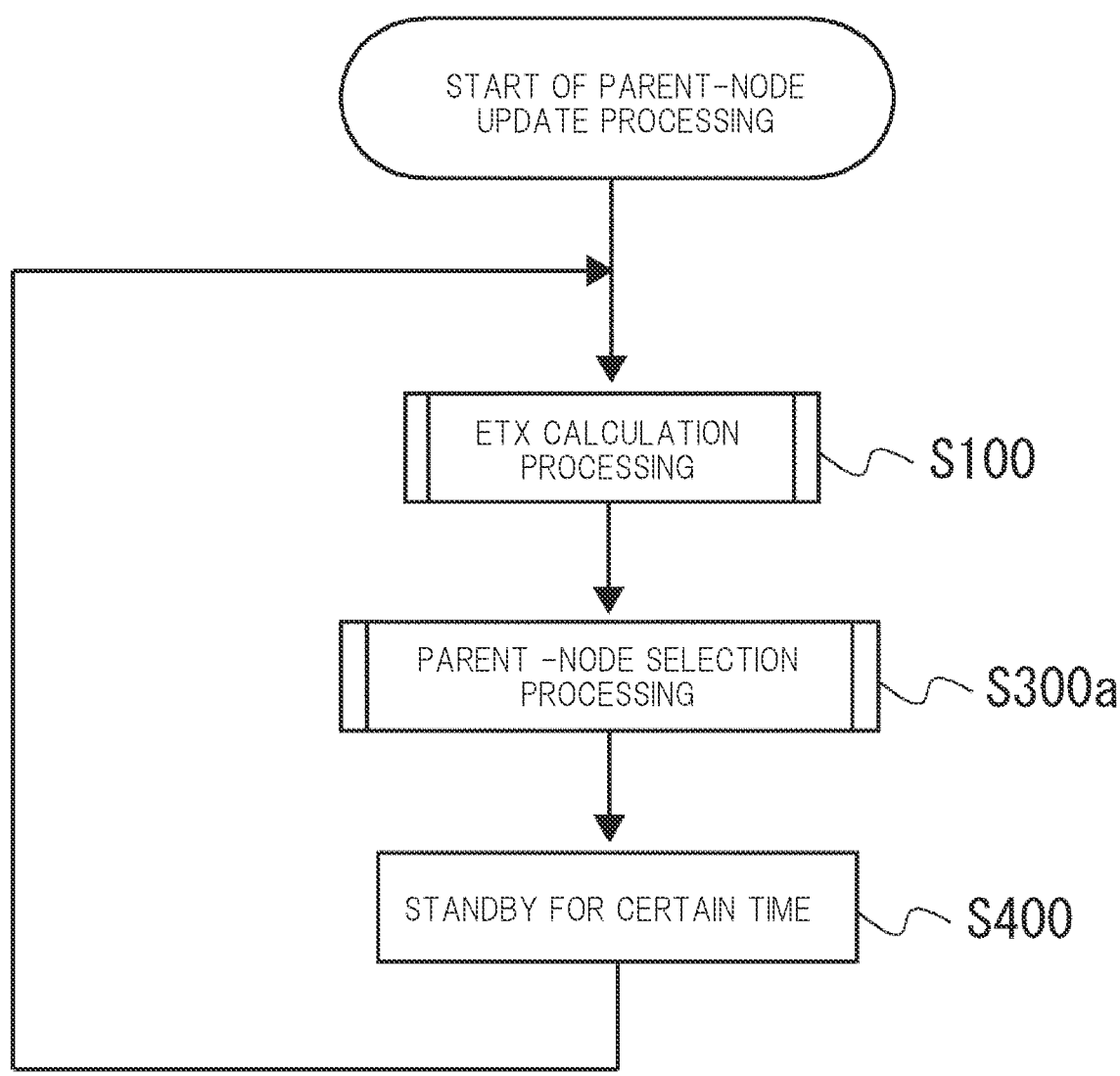
FIG. 16 is a flowchart showing a flow of a parent-node update processing according the present fifth embodiment.

FIG. 16 is a flowchart showing a flow of the parent-node update processing according to the present fifth embodiment. The assumption is that the processing of FIGS. 4 and 5 have been already executed.

First, the node N4 executes the ETX calculation processing (S100). In other words, the node N4 calculates the ETX of all the parent candidate nodes N1 to N3. On the other hand, as different from FIG. 6, the RCV calculation processing has not been executed in the foregoing steps. Next, the node N4 executes the parent-node selection processing (S300a).

Figure 17:
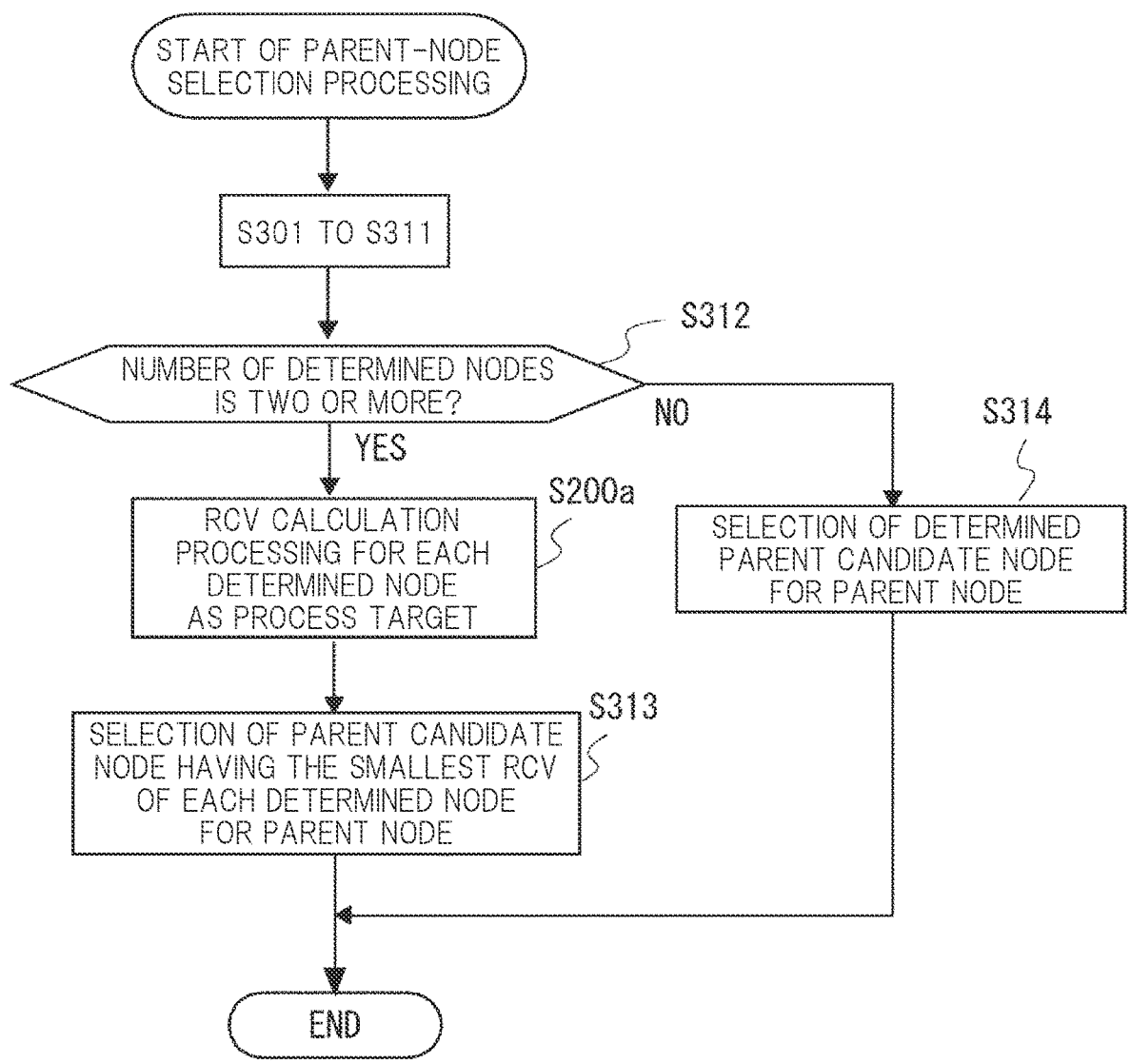
FIG. 17 is a flowchart showing a flow of a parent-node selection processing according the present fifth embodiment.

FIG. 17 is a flowchart showing a flow of the parent-node selection processing according to the present fifth embodiment. First, the node N4 executes the above-described steps S301 to S311 in FIG. 13. Then, the node N4 determines whether the number of the determined parent candidate nodes is two or more (S312). If it is determined that the number is two or more, the node N4 executes the RCV calculation processing shown in FIG. 8 for each of the determined nodes as the process targets (S200a). Then, the node N4 acquires the RCV of each determined node, and selects the parent candidate node having the smallest RCV as the parent node (S313). On the other hand, if it is determined in the step S312 that the number of the determined parent candidate nodes is not two or more, in other words, is one, the node N4 selects the determined parent candidate node as the parent node of (S314).

Then, the node N4 calculates (updates) the rank candidate value of the selected parent candidate node by using the above-described formula 4 and the acquired RCV, and sets the calculated rank candidate value to be the rank of the own node.

As described above, according to the present fifth embodiment, the RCV calculation processing for the undetermined parent candidate node can be removed in comparison with the above-described fourth embodiment, and therefore, the process efficiency of the entire parent-node update processing can be improved.

In the foregoing, the invention made by the present inventor has been concretely described on the basis of the embodiments. However, it is needless to say that the present invention is not limited to the foregoing embodiments, and various modifications can be made within the scope of the present invention.

What is claimed is:
1. A radio communication device comprising:
a first calculating circuit configured to calculate a transmission quality indicator value of each of a plurality of parent candidate nodes based on a transmission frame transmitted from an own device to each of the plurality of parent candidate nodes;
a second calculating circuit configured to calculate a reception quality indicator value of each of the plurality of parent candidate nodes based on a reception frame transmitted from each of the plurality of parent candidate nodes and received by the own device; and
a selecting circuit configured to select a parent node for use in a communication path among the plurality of parent candidate nodes based on the transmission quality indicator value and the reception quality indicator value,
wherein the first calculating circuit calculates the transmission quality indicator value by using the transmission frame and check response for the transmission frame,
wherein the second calculating circuit calculates the reception quality indicator value based on a number of error-frame receptions that is a number of reception frames detected to be a reception error among the reception frames, and
wherein, when a number of normally-received frames among the reception frames is set to a number of normal-frame receptions, the second calculating circuit calculates the reception quality indicator value by using a formula "Reception quality indicator value=(Number of normal-frame receptions+Number of error-frame receptions)/Number of normal-frame receptions×Predetermined Coefficient".

2. The radio communication device according to claim 1, wherein the second calculating circuit calculates the reception quality indicator value so that the more the number of error-frame receptions detected to be the reception error among the reception frames is, the worse the quality is.

3. The radio communication device according to claim 1, wherein the first calculating circuit calculates the transmission quality indicator value based on the number of times of the receptions for the check response.

4. The radio communication device according to claim 1, wherein the second calculating circuit calculates the reception quality indicator value by taking, as the reception frame, a unicast frame transmitted from each of the plurality of parent candidate nodes to the radio communication device.

5. The radio communication device according to claim 1, wherein the second calculating circuit calculates the reception quality indicator value by taking, as the reception frame, a multicast frame containing information of a destination that is the radio communication device, transmitted from each of the plurality of parent candidate nodes.

6. The radio communication device according to claim 1, wherein the second calculating circuit takes a CRC (Cyclic Redundancy Check) error as the reception error.

7. The radio communication device according to claim 1, wherein the selecting circuit calculates a rank candidate value of each of the parent candidate nodes based on the transmission quality indicator value and the reception quality indicator value, the rank candidate value being a candidate for a path selection indicator of the radio communication device in a case of taking each parent candidate node as a parent node, and wherein the selecting circuit selects the parent node based on the rank candidate value.

8. The radio communication device according to claim 7, wherein the selecting circuit calculates the rank candidate value of each of the parent candidate nodes by using the rank candidate value of each parent candidate node being the path selection indicator and the transmission quality indicator value and the reception quality indicator value of the parent candidate node.

9. The radio communication device according to claim 8, wherein the selecting circuit calculates the rank candidate value of each of the parent candidate nodes by using a formula "Rank candidate value=Rank value of parent candidate node+Transmission quality indicator value of parent candidate node×Predetermined Transmission coefficient+ Reception quality indicator value of parent candidate node× Predetermined Reception coefficient".

10. The radio communication device according to claim 1, wherein the selecting circuit calculates a total value of the transmission quality indicator value and the rank candidate value of each of the parent candidate nodes being the path selection indicator, determines a parent candidate node having the best communication quality based on the total value, and, if the number of the determined parent candidate nodes is plural, selects a parent candidate node having the best communication quality in consideration of the reception quality indicator value as the parent node.

11. The radio communication device according to claim 10,
wherein the selecting circuit calculates the total value after the first calculating circuit calculates the transmission quality indicator value of each of the parent candidate nodes,
wherein the second calculating circuit calculates the reception quality indicator value of each of the plurality of determined parent candidate nodes if the number of the parent candidate nodes determined by the selecting circuit is plural, and
wherein the selecting circuit selects the parent node among the plurality of determined parent candidate nodes based on the reception quality indicator value.

12. The radio communication device according to claim 8, wherein the reception frame includes at least a part of a NS (Neighbor Solicitation) frame, a PA (PAN Advertisement) frame, a PC (PAN configuration) frame, and a DIO (DODAG (Destination Oriented Directed Acyclic Graph) Information Object) frame in RPL (IPv6 Routing Protocol for Low power and Lossy network).

13. A radio path control method comprising the steps, performed by a radio communication device, of:
calculating a transmission quality indicator value of each of a plurality of parent candidate nodes based on a transmission frame transmitted from an own device to each of the plurality of parent candidate nodes;
calculating a reception quality indicator value of each of the parent candidate nodes based on a reception frame transmitted from each of the plurality of parent candidate nodes and received by the own device; and
selecting a parent node for use in a communication path among the plurality of parent candidate nodes based on the transmission quality indicator value and the reception quality indicator value,
wherein the transmission quality indicator value is calculated using the transmission frame and check response for the transmission frame,
wherein the reception quality indicator value is calculated based on a number of error-frame receptions that is a number of reception frames detected to be a reception error among the reception frames, and
wherein, when a number of normally-received frames among the reception frames is set to the number of normal-frame receptions, the reception quality indicator value is calculated using a formula "Reception quality indicator value=(Number of normal-frame receptions+Number of error-frame receptions)/Number of normal-frame receptions×Predetermined Coefficient".

14. The radio path control method according to claim 13 further comprising the step of
calculating the transmission quality indicator value by using the transmission frame and check response for the transmission frame.

15. The radio path control method according to claim 14 further comprising the step of
calculating the reception quality indicator value based on the number of error-frame receptions that is the number of reception frames detected to be a reception error among the reception frames.

16. A non-transitory computer readable storage medium causing a computer to execute:
a processing of calculating a transmission quality indicator value of each of a plurality of parent candidate nodes based on a transmission frame transmitted from an own device to each of the plurality of parent candidate nodes;
a processing of calculating a reception quality indicator value of each of the parent candidate nodes based on a reception frame transmitted from each of the plurality of parent candidate nodes and received by the own device; and
a processing of selecting a parent node for use in a communication path among the plurality of parent candidate nodes based on the transmission quality indicator value and the reception quality indicator value,
wherein the processing of calculating the transmission quality indicator value includes calculating the transmission quality indicator value using the transmission frame and check response for the transmission frame,
wherein the processing of calculating the reception quality indicator value includes calculating the reception quality indicator value based on a number of error-frame receptions that is a number of reception frames detected to be a reception error among the reception frames, and
wherein, when the number of normally-received frames among the reception frames is set to a number of normal-frame receptions, the processing of calculating the reception quality indicator value includes calculating the reception quality indicator value using a formula "Reception quality indicator value=(Number of normal-frame receptions+Number of error-frame receptions)/Number of normal-frame receptions×Predetermined Coefficient".

17. The computer readable storage medium according to claim 16 further causing the computer to execute:
a processing of calculating the transmission quality indicator value by using the transmission frame and check response for the transmission frame.

* * * * *